United States Patent
Anthony

(10) Patent No.: US 9,409,364 B2
(45) Date of Patent: Aug. 9, 2016

(54) VERSATILE CONTAINER LID

(71) Applicant: Patricia M. Anthony, Auburn Hills, MI (US)

(72) Inventor: Patricia M. Anthony, Auburn Hills, MI (US)

(*) Notice: Subject to any disclaimer, the term of this patent is extended or adjusted under 35 U.S.C. 154(b) by 0 days.

(21) Appl. No.: 14/465,805

(22) Filed: Aug. 21, 2014

(65) Prior Publication Data
US 2015/0175328 A1    Jun. 25, 2015

Related U.S. Application Data

(63) Continuation-in-part of application No. 13/439,823, filed on Apr. 4, 2012, now abandoned.

(60) Provisional application No. 62/006,990, filed on Jun. 3, 2014.

(51) Int. Cl.
B29D 99/00      (2010.01)
B65D 43/02      (2006.01)

(52) U.S. Cl.
CPC ........ B29D 99/0096 (2013.01); B65D 43/0208 (2013.01); B65D 2251/08 (2013.01); B65D 2543/00092 (2013.01); B65D 2543/00203 (2013.01); B65D 2543/00296 (2013.01); B65D 2543/00518 (2013.01); B65D 2543/00555 (2013.01); Y10T 29/49826 (2015.01)

(58) Field of Classification Search
CPC . B65D 53/02; B65D 43/0202; B29D 99/0096
USPC ............ 215/317; 220/802, 790, 367.1, 366.1, 220/694, 700, 369, 799, 800, 287, 796
See application file for complete search history.

(56) References Cited

U.S. PATENT DOCUMENTS

| | | | |
|---|---|---|---|
| 893,469 | A | 7/1908 | Essmuller |
| 1,544,817 | A | 7/1925 | Davisson |
| D79,266 | S | 8/1929 | Schmidt |
| 1,977,641 | A | 10/1934 | Loeber |
| 2,034,739 | A | 3/1936 | Bodor |
| 2,168,734 | A | 8/1939 | Freeman |

(Continued)

FOREIGN PATENT DOCUMENTS

| | | |
|---|---|---|
| DE | 884 231 C | 7/1953 |
| EP | 1 666 368 A1 | 6/2006 |

(Continued)

OTHER PUBLICATIONS

Extended European Search Report dated Oct. 23, 2015 for EP Application No. 15170602.5-1707.

(Continued)

*Primary Examiner* — Robert J Hicks
*Assistant Examiner* — Kareen Thomas

(57) ABSTRACT

In one embodiment of the invention, a versatile lid includes: a lid body comprising a stair-steps configuration; and a plurality of rings formed in the lid body; wherein the plurality of rings includes a first ring that is configured to receive a first container having a first size and a second ring that is configured to receive a second container having a second size. In another embodiment of the invention, a versatile lid includes: a lid body comprising a center portion, a bendable lid portion, and an edge portion; wherein the bendable lid portion is between the center portion and the edge portion; and wherein the bendable lid portion is configured to bend in an upward direction and bend in a downward direction.

15 Claims, 29 Drawing Sheets

(56) References Cited

U.S. PATENT DOCUMENTS

| | | | |
|---|---|---|---|
| 2,218,308 A | 10/1940 | Comer | |
| 2,636,636 A | 4/1953 | Smith | |
| 2,682,970 A | 7/1954 | Brothers, Jr. | |
| D172,854 S | 8/1954 | Waldo | |
| 2,752,972 A | 7/1956 | Tupper | |
| 2,772,018 A | 11/1956 | Weiss | |
| 2,948,903 A | 8/1960 | Gilmer | |
| 3,141,567 A | 7/1964 | Schearer | |
| 3,157,304 A | 11/1964 | Judge | |
| D213,390 S | 2/1969 | Bruce | |
| 3,606,074 A | 9/1971 | Hayes | |
| 3,655,089 A | 4/1972 | Tower | |
| D230,138 S | 1/1974 | Weller | |
| 3,807,457 A | 4/1974 | Logsdon | |
| D232,511 S | 8/1974 | Heiser et al. | |
| D232,703 S | 9/1974 | Konzi | |
| 3,850,341 A | 11/1974 | Bart | |
| D241,917 S | 10/1976 | Borum | |
| D250,870 S | 1/1979 | Stahel | |
| D265,061 S * | 6/1982 | Tricinella | D7/391 |
| 4,411,032 A | 10/1983 | Lewy | |
| D272,860 S | 2/1984 | Swatzell | |
| 4,566,605 A | 1/1986 | Rogers | |
| D287,803 S | 1/1987 | Daenen et al. | |
| D288,727 S | 3/1987 | Mandeville | |
| D288,891 S | 3/1987 | Saito | |
| D289,719 S | 5/1987 | Daenen et al. | |
| 4,901,881 A | 2/1990 | McElroy | |
| 4,989,748 A * | 2/1991 | Parr, Jr. | A47G 19/26 219/734 |
| D319,119 S | 8/1991 | Calnin | |
| D329,169 S | 9/1992 | Robbins, III | |
| D333,884 S | 3/1993 | Colett | |
| D352,988 S | 11/1994 | Jan | |
| D354,655 S | 1/1995 | Daenen et al. | |
| 5,392,949 A | 2/1995 | McKenna | |
| 5,568,735 A | 10/1996 | Newkirk et al. | |
| D376,034 S | 11/1996 | Willis | |
| D381,268 S | 7/1997 | Rush et al. | |
| D395,195 S | 6/1998 | Helberg et al. | |
| D412,810 S | 8/1999 | Alfred | |
| D419,829 S | 2/2000 | Wilson et al. | |
| D427,063 S | 6/2000 | May | |
| D432,858 S | 10/2000 | Hayes et al. | |
| 6,170,696 B1 | 1/2001 | Tucker et al. | |
| D443,184 S | 6/2001 | Maxwell et al. | |
| D445,641 S | 7/2001 | Conti | |
| 6,260,729 B1 | 7/2001 | Mitchell et al. | |
| D448,288 S | 9/2001 | Zettle et al. | |
| D456,944 S | 5/2002 | Carlquist | |
| D462,880 S | 9/2002 | Maxwell et al. | |
| D469,656 S | 2/2003 | Vollmer | |
| D485,468 S | 1/2004 | Roth et al. | |
| D485,473 S | 1/2004 | Dais et al. | |
| 6,935,380 B2 | 8/2005 | Rahimzadeh et al. | |
| D512,872 S | 12/2005 | McMahon, III et al. | |
| D539,098 S | 3/2007 | Tucker et al. | |
| D541,598 S | 5/2007 | Kim | |
| D542,100 S | 5/2007 | Kim | |
| D551,496 S | 9/2007 | Ablo et al. | |
| 7,264,135 B2 | 9/2007 | Savicki et al. | |
| D555,982 S | 11/2007 | Tucker et al. | |
| 7,299,941 B2 * | 11/2007 | McMahon et al. | 220/780 |
| D594,270 S | 6/2009 | Rae | |
| D613,111 S | 4/2010 | Furlong | |
| D615,349 S | 5/2010 | Furlong | |
| 7,874,024 B1 | 1/2011 | Singh | |
| D636,674 S | 4/2011 | Golota et al. | |
| 8,007,615 B2 | 8/2011 | Sadlier | |
| D646,923 S | 10/2011 | Chhay | |
| 8,123,070 B2 | 2/2012 | Lim | |
| D666,876 S | 9/2012 | Rusnak | |
| 2004/0112906 A1 * | 6/2004 | von Holdt, Jr. | 220/657 |
| 2006/0261065 A1 | 11/2006 | Claypool et al. | |
| 2007/0023434 A1 | 2/2007 | Kim | |
| 2009/0183807 A1 | 7/2009 | Sadlier | |
| 2010/0207297 A1 | 8/2010 | Sadlier | |
| 2012/0138608 A1 | 6/2012 | Rusnak et al. | |
| 2012/0298667 A1 | 11/2012 | Anthony | |
| 2014/0332538 A1 | 11/2014 | Chen | |

FOREIGN PATENT DOCUMENTS

| | | |
|---|---|---|
| EP | 2 006 211 A2 | 12/2008 |
| EP | 2 006 211 A3 | 5/2009 |
| WO | WO 2006/073466 A2 | 7/2006 |

OTHER PUBLICATIONS

Office Action mailed Oct. 14, 2015 for U.S. Appl. No. 29/500,191.

"Le Creuset Classic Cast Iron Round Casserole, 18 cm", at amazon. com, page dated Dec. 19, 2006.

Silicon Sealing Lid, retrieved from the Internet: http://www.amazon.com/Seen-Silicone-Flexible-Sealing-System/dp/B0027V4ZVK (printed on Aug. 8, 2015).

Office Action mailed Apr. 18, 2016 for U.S. Appl. No. 13/439,823.

* cited by examiner

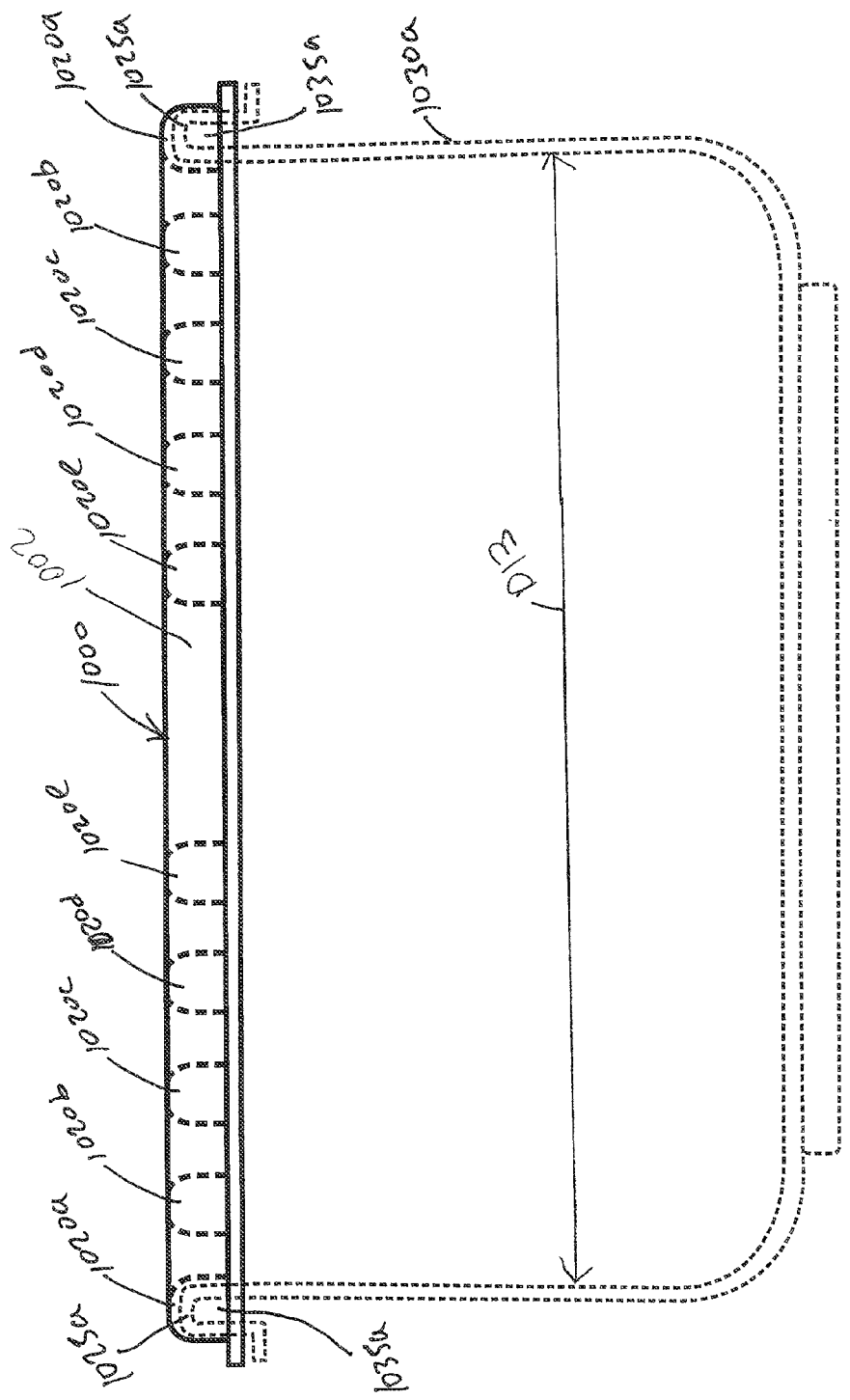

FIG. 12.7

VERSATILE CONTAINER LID

CROSS REFERENCE TO RELATED APPLICATIONS

This application claims the benefit of and priority to U.S. Provisional Application No. 62/006,990. This U.S. Provisional Application No. 62/006,990 is hereby fully incorporated herein by reference.

This application is a continuation-in-part application of U.S. application Ser. No. 13/439,823.

Application Ser. No. 13/439,823 is a continuation-in-part application of Design application Ser. No. 29/405,305, filed Nov. 1, 2011.

Application Ser. No. 13/439,823 is a continuation-in-part application of Design application Ser. No. 29/405,306, filed Nov. 1, 2011.

Application Ser. No. 13/439,823 is a continuation-in-part application of Design application Ser. No. 29/392,677, filed May 25, 2011.

Application Ser. No. 13/439,823 is a continuation-in-part application of Design application Ser. No. 29/392,680, filed May 25, 2011.

This application claims the benefits of and priorities to application Ser. Nos. 13/439,823, 29/405,305, 29/405,306, 29/392,677, and 29/392,680.

Application Ser. No. 13/439,823, 29/405,305, 29/405,306, 29/392,677, and 29/392,680 are hereby fully incorporated herein by reference.

TECHNICAL FIELD

Embodiments of the invention relate generally to a versatile container lid.

BACKGROUND

A variety of food containers and corresponding lids are available to consumers in various sizes, shapes (e.g., bowls, box-shaped containers, and/or the like), and/or configurations. Consumers often unnecessarily spend their valuable time looking for a particular lid that fits into a bowl or other container and/or often sift or search through a pile of mismatched lids. In other words, the consumer is often required to rummage through countless lids (or a relatively high number of lids in the kitchen) in order to find a lid that fits a particular food container.

Additionally, maintaining a large number of lids does not allow the consumer to save space in the kitchen, kitchen cabinets, and/or cupboards. Furthermore, the currently available tin foil products and plastic wrap products may not provide a sufficient air-tight cover for food containers, are disposable products that may harm the environment, and/or would add to the consumer's expense since new foil products and/or plastic wrap products are disposable products that are required to be re-purchased by the consumer. Therefore, some consumers are frustrated with the requirement and inconvenience of having to keep different sized lids that are associated with different sized food containers and/or with the unnecessary expense of purchasing disposable food covers.

Various food container lids are disclosed in, for example, the following patent-related publications: U.S. Pat. No. 7,264,135, U.S. Pat. No. 8,007,615, US 2009/0183807, US 2010/0207297, and U.S. D555,982. However, these conventional products: (1) do not provide a sufficiently rigid cover, (2) are not able to provide a cover for different sized food containers, (3) require multiple parts that are subject to wear-and-tear due to the frequent use of the food containers, and/or (4) require particular shapes and/or configurations that lead to additional manufacturing expenses and complexities. Silicone sealing lids which are reusable and safe for use in a refrigerator, freezer, and/or dishwasher are also commercially available. However, any particular silicone sealing lids is only usable for a corresponding container size. Therefore, the conventional products have various disadvantages that are not desirable for the consumer.

Based on the above discussion, the current technology is limited in its capabilities and suffers from at least the above constraints and deficiencies.

SUMMARY

In one embodiment of the invention, a versatile container lid includes: a lid body; and a plurality of rings formed in the lid body; wherein the plurality of rings includes a first ring that is configured to receive a first container having a first size and a second ring that is configured to receive a second container having a second size.

In another embodiment of the invention, a versatile container lid includes: a lid body comprising a center portion, a bendable lid portion, and an edge portion; wherein the bendable lid portion is between the center portion and the edge portion; and wherein the bendable lid portion is configured to bend in an upward direction and bend in a downward direction.

In another embodiment of the invention, a method of manufacturing a versatile lid includes: forming a lid body from a material, forming a plurality of rings within the lid body, and forming a top surface of the lid body, wherein the top surface has a given configuration.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Additionally, the left-most digit of a reference number may identify the drawing in which the reference number first appears.

FIG. 10A is a block diagram of a side view of a versatile container lid, in accordance with another embodiment of the invention.

FIG. 23 is a block diagram of a cross-sectional side view of a versatile container lid, in accordance with an embodiment of the invention, wherein a container is detached or separated from the lid.

DETAILED DESCRIPTION OF PREFERRED EMBODIMENTS

Figure 1:
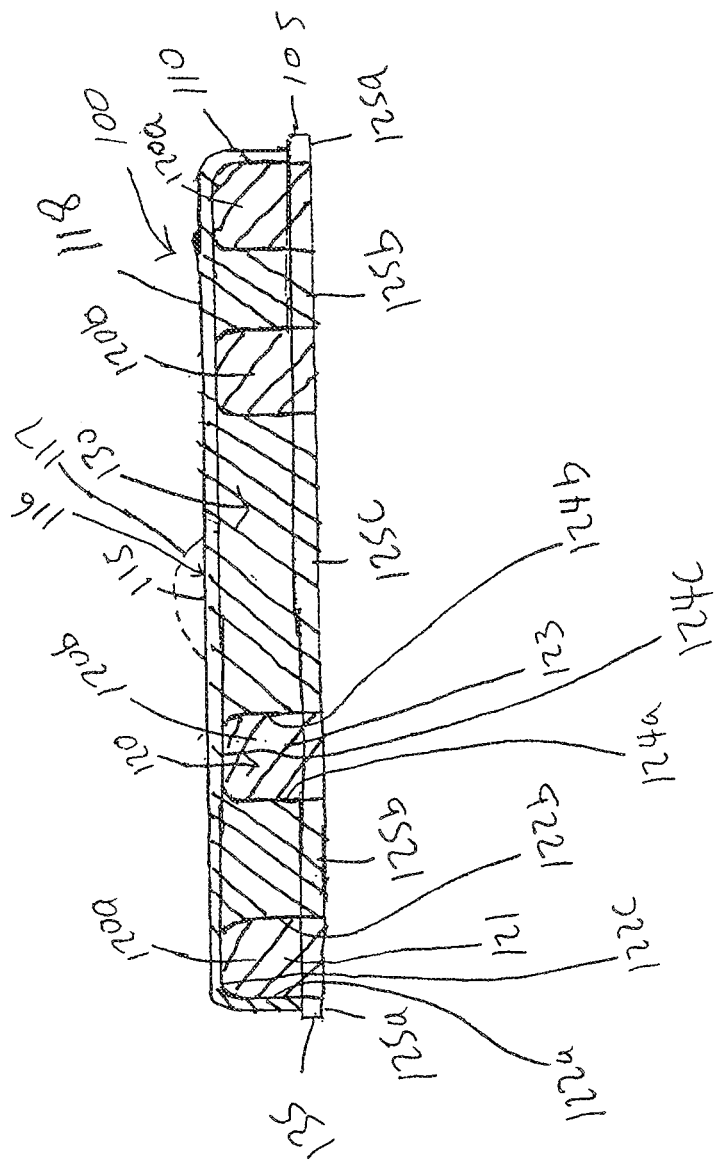
FIG. 1 is a block diagram of a cross-sectional side view of a versatile container lid, in accordance with an embodiment of the invention.

In the description herein, numerous specific details are provided, such as examples of components, materials, parts, structures, and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, structures, and/or the like. In other instances, well-known components, materials, parts, structures, methods, or operations are not shown or described in detail to avoid obscuring aspects of embodiments of the invention. Additionally, the figures are representative in nature and their shapes are not intended to illustrate the precise shape or precise size of any element and are not intended to limit the scope of the invention.

Those skilled in the art will understand that when an element or part in the drawings is referred to as being "on" (or "connected" to or "coupled" to or "attached" to) another element, it can be directly on (or directly attached to) the other element or intervening elements may also be present. Furthermore, relative terms such as "inner", "outer", "upper", "above", "lower", "beneath", "below", "downward", and "upward" and similar terms, may be used herein to describe a relationship of one element relative to another element. It is understood that these terms are intended to encompass different orientations of the device in addition to the orientation depicted in the figures.

Although the terms first, second, and the like may be used herein to describe various elements, components, parts, regions, layers, chambers, and/or sections, these elements, components, parts, regions, layers, chambers, and/or sections should not be limited by these terms. These terms are only used to distinguish one element, component, part, region, layer, chamber, or section from another element, component, part, region, layer, chamber, or section. Thus, a first element, component, part, region, layer, chamber, or section discussed below could be termed a second element, component, part, region, layer, chamber, or section without departing from the teachings of the present invention.

Embodiments of the invention are described herein with reference to cross-sectional view illustrations that are schematic illustrations of representative embodiments of the invention. As such, variations from the shapes of the illustrations as a result of, for example, manufacturing techniques and/or tolerances are expected. Embodiments of the invention should not be construed as limited to the particular shapes of the regions, elements, components, parts, layers, chambers, and/or sections illustrated herein but are to include deviations in shapes that result, for example, from manufacturing or particular implementations. For example, an element illustrated or described as square or rectangular may typically have rounded or curved features due to normal manufacturing tolerances or due to a particular implementation. Thus, the elements illustrated in the figures are schematic in nature and their shapes are not intended to illustrate the precise shape of an element of a device and are not intended to limit the scope of the invention.

FIG. 1 is a block diagram of a cross-sectional side view of versatile container lid 100 (apparatus 100), in accordance with an embodiment of the invention. The lid 100 includes a base portion 105 and an upper portion 110 coupled to (or integrated with) the base portion 105. In other embodiments of the invention, the base portion 105 and upper portion 105 may be a single piece that forms the lid 100. Other variations in the components of the lid 100 are possible in other embodiments of the invention.

In an embodiment of the invention, an upper central surface 115 (or top center portion 115) of the upper portion 110 is a flat surface 116 or a substantially flat surface 116. In another embodiment of the invention, the upper central surface 115 may have another configuration, shape, and/or characteristic such as a non-planar surface 117 which is shown in dashed (phantom) lines. Although the exemplary non-planar surface 117 is depicted in FIG. 1 as a hemisphere configuration, those skilled in the relevant art(s) would realize based on the discussion herein that the non-planar surface 117 may have other shapes and/or configuration and/or may be disposed in another position on any position on a top surface 118 of the upper portion 110 and/or may be a single element 117 and/or may be multiple elements 117 or any amount or number of elements 117. The upper central surface 115 is disposed within a top surface central area of the lid 100 and is on the top surface of the lid body 130.

In accordance with an embodiment of the invention, the lid 100 includes a plurality of rings (which are generally referred herein as rings 120). In FIG. 1, the exemplary lid 100 includes the rings 120a and 120b, although the number of rings 120 may vary in another embodiment of the invention. As will be discussed below, a ring 120 is a hollow section between ridges of the lid 100, and each ring 120 can removably receive and removably attach (and/or removably secure and/or removably couple) the lid 100 to a container as will be discussed below. Two components are removably attached (or removably coupled or removably secured) means that two different components can be attached together or detached apart. Therefore, the rings 120a and 120b are formed by respective openings (or respective hollow portions) in the solid body portion 130 (or solid body 130) of the lid 100. If the rings 120a and 120b are circular, then the two rings 120a and 120b will be concentric or substantially concentric. If the rings 120a and 120b are non-circular (e.g., square or rectangular), then adjacent portions of the rings 120a and 120b will be parallel or substantially parallel.

Otherwise stated, the plurality of rings 120 are formed within the lid body 130 of the lid 100. One exemplary plurality of rings 120 includes a first ring 120a that is configured to removably receive a first container 600 (FIG. 6) having a first size D6 and a second ring 120b that is configured to removably receive a second container 700 (FIG. 7) having a second size D8. As will be discussed below, the lid 100 can include one or more additional rings among the plurality of rings 120 so that the lid 100 also has a third ring that is configured to removably receive a third container (e.g., container 930a in FIG. 9A) having a third size D10. The lid 100 can include one or more additional rings.

The opening 121 in the ring 120a is between the upright wall 122a (vertical wall 122a) and the upright wall 122b (vertical wall 122b) which is opposite to the wall 122a. The walls 122a and 122b are part of the lid body 130. The opening 121 is also below upper wall 122c which is above the walls 122a and 122b and is typically substantially perpendicular to the walls 122a and 122b. The upper wall 122c is also part of the lid body 130.

The opening 123 in the ring 120b is between the upright wall 124a (vertical wall 124a) and the upright wall 124b (vertical wall 124b) which is opposite to the wall 124a. The walls 124a and 124b are part of the lid body 130. The opening 123 is also below upper wall 124c which is above the walls 124a and 124b and is typically substantially perpendicular to the walls 124a and 124b. The upper wall 124c is also part of the lid body 130.

In the exemplary lid 100, the ring 120a is disposed between the ridges 125a and 125b and disposed within the lid body 130, with the ridge 125a forming an outer edge portion 135 (or edge portion 135) that spans the circumference (or that spans the outer edge) of the base 105. The ridges 125a, 125b, and 125c are also part of the lid body 130. The ring 120b is disposed between the ridges 125b and 125c, with the ridge 125c disposed adjacent to (and/or is a part of) the center portion 115 of the lid 100.

In an embodiment of the invention, the lid 100 may be formed by any suitable rigid material or semi-rigid material such as, by way of example and not by way of limitation, plastic, rubber, and/or another suitable synthetic material. In another embodiment of the invention as will be discussed below in additional details, the lid 100 may be foldable and, therefore, the lid is at least partly formed by a suitably flexible material, substantially flexible material, or foldable material such as, by way of example and not by way of limitation, silicone (i.e., silicone rubber).

The lid 100 may be manufactured by standard manufacturing methods known to those skilled in the relevant art(s) such as, by way of example and not by way of limitation, molding, stamping, extrusion processing, casting, polymer foam processing and forming, and/or other standard shaping processes of synthetic materials.

Figure 2:
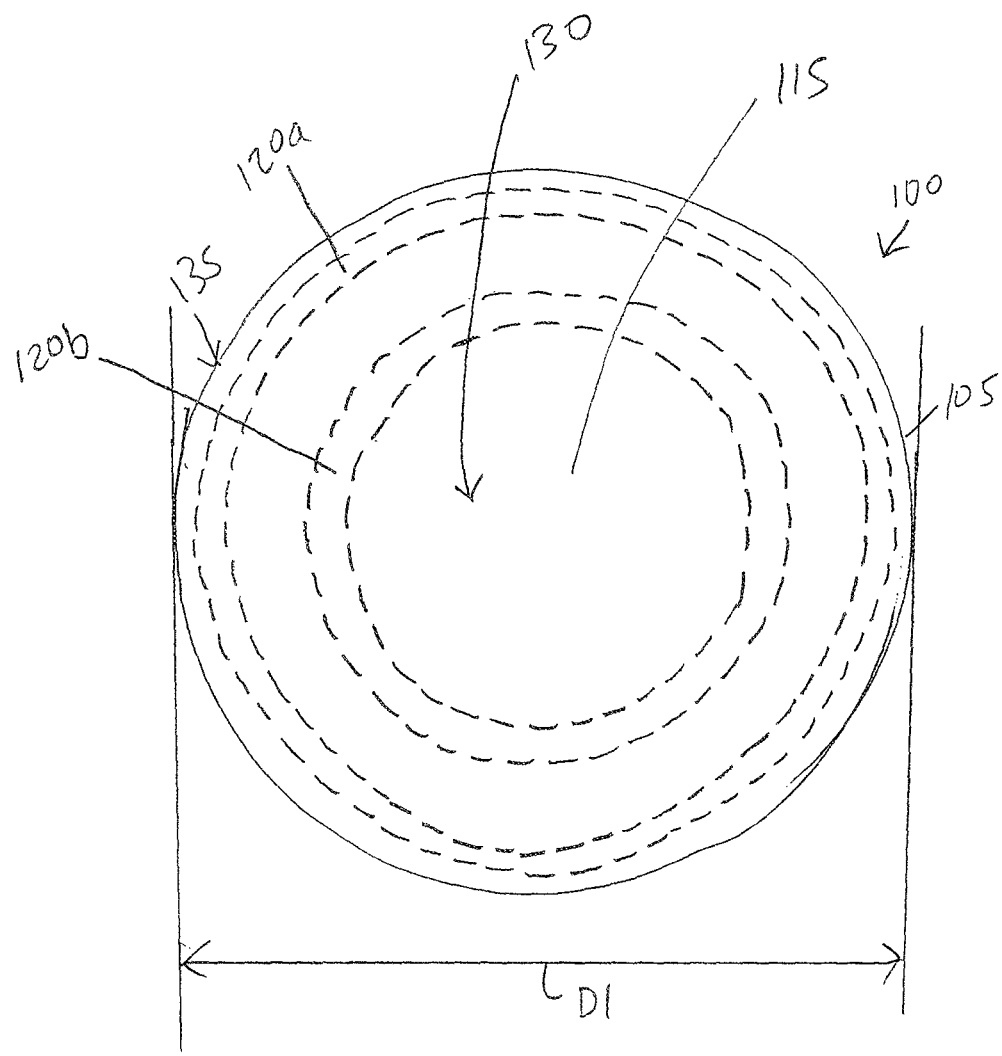
FIG. 2 is a block diagram of a top view of a versatile container lid, in accordance with an embodiment of the invention.

FIG. 2 is a block diagram of a top view of a versatile container lid 100, in accordance with an embodiment of the invention. The lid 100 has a diameter D1 (or dimension D1) between the edge portion 135 and is circular in shape or substantially circular in shape. The diameter D1 may be set at any suitable length, so that the lid 100 may have different sizes for covering any variety of sizes of bowls. As will be discussed below, in other embodiments of the invention, the lid 100 may have other shapes.

Figure 3:
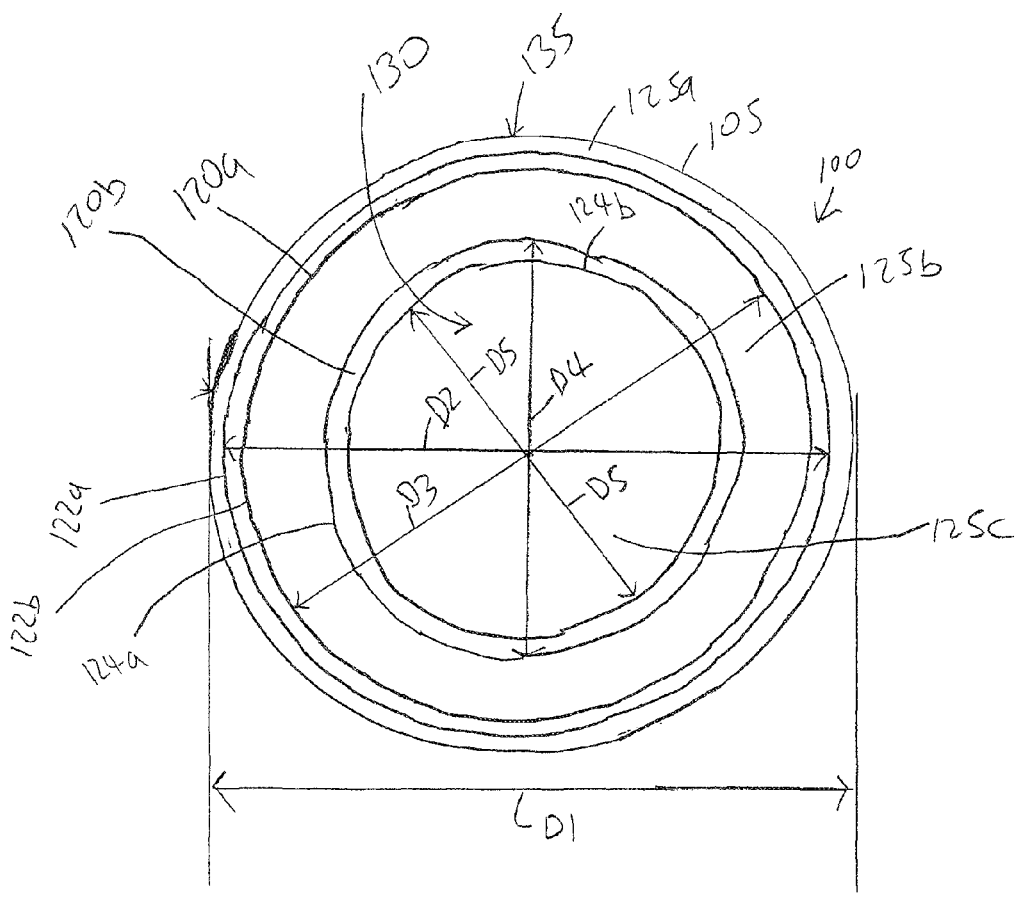
FIG. 3 is a block diagram of a bottom view of a versatile container lid of FIG. 2, in accordance with an embodiment of the invention.

FIG. 3 is a block diagram of a bottom view of a versatile container lid 100 of FIG. 2, in accordance with an embodiment of the invention. The vertical walls 122a, 122b, 124a, and 124b are circular-shaped walls that are part of the lid body 130. The vertical wall 122a has a diameter of D2 and the vertical wall 122b has a diameter of D3, where D1>D2>D3. The vertical wall 124a has a diameter of D4 and the vertical wall 124b has a diameter of D5, where D1>D2>D3>D4>D5 and where the diameters D1, D2, D3, D4, and D5 may be set to any suitable lengths so that the lid 100 can cover any container of different sizes. The diameters D1 through D5 will be discussed further below when the lid 100 is used to cover different sized containers.

As shown in FIG. 3, the rings 120a and 120b are substantially circular and are substantially concentric.

Figure 4:
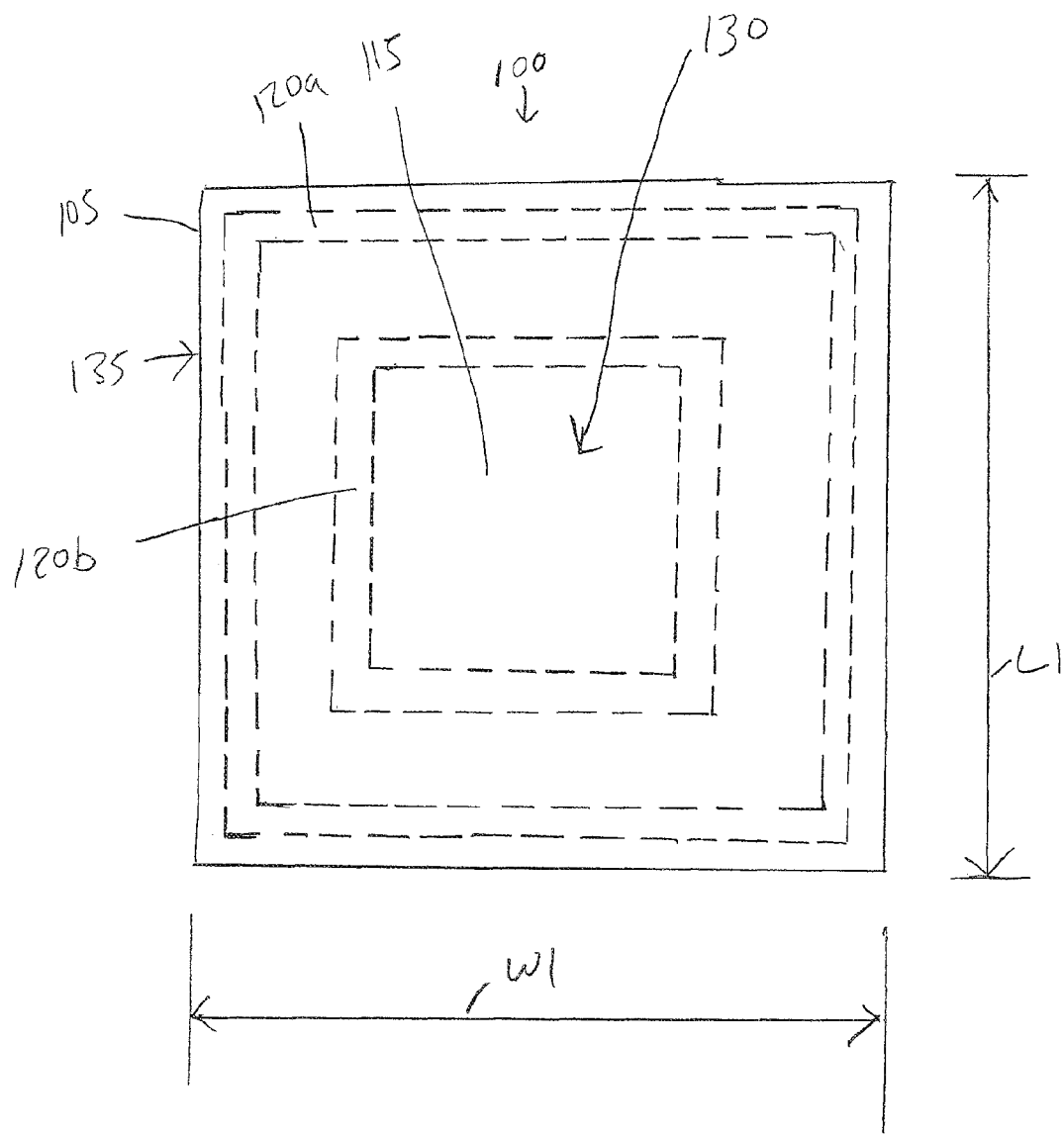
FIG. 4 is a block diagram of a top view of a versatile container lid, in accordance with another embodiment of the invention.

FIG. 4 is a block diagram of a top view of a versatile container lid 100, in accordance with another embodiment of the invention. The lid 100 has a length of L1 and width of W1, where L1 and W1 may be set at any suitable set to any suitable length, so that the lid 100 may have different sizes for covering any variety of sizes of containers. If L1=W1, then the lid 100 will have a substantially square shape. If L1 does not equal W1 (e.g., L1>W1), the lid 100 will have a substantially non-square shape or substantially rectangular shape.

Figure 5:
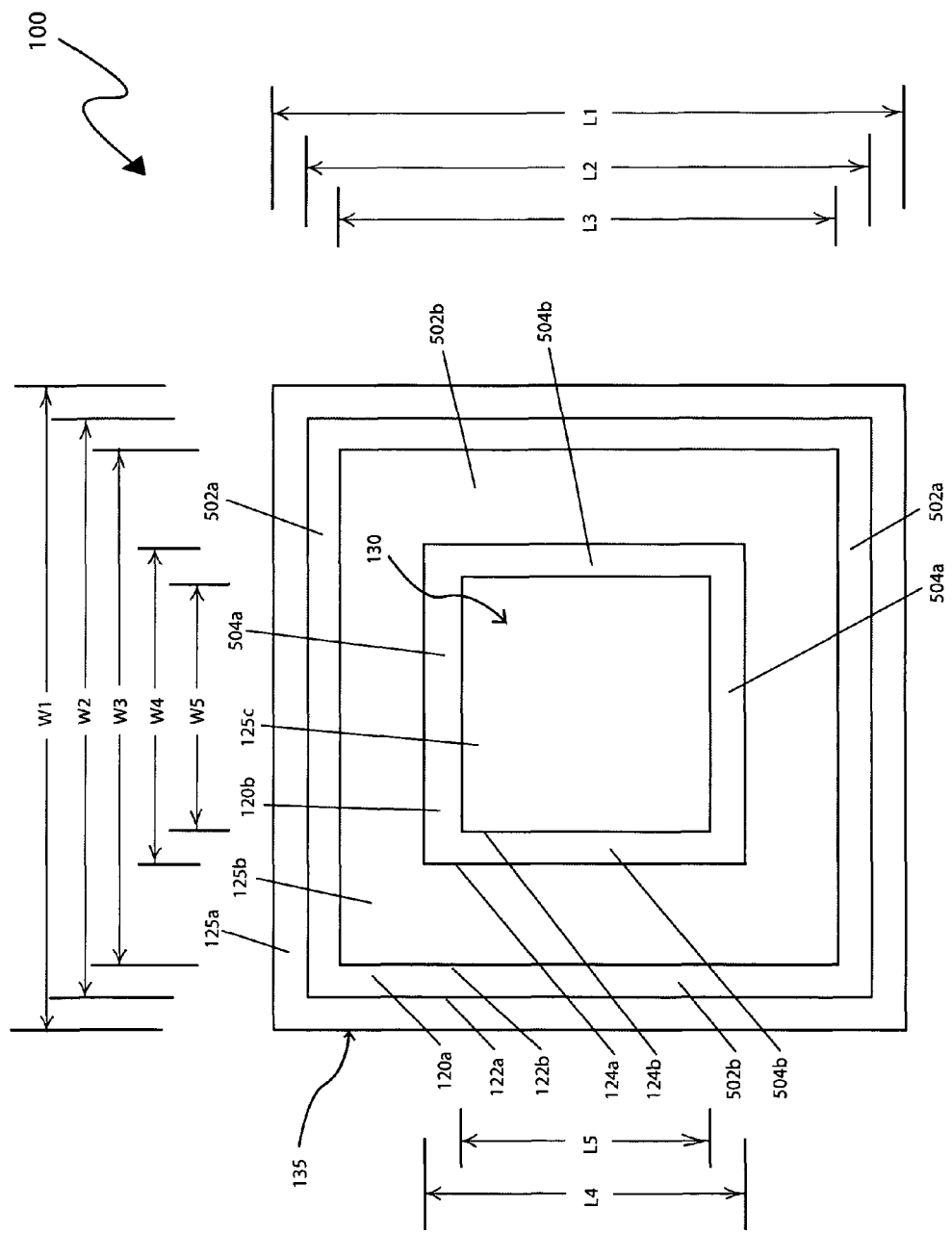
FIG. 5 is a block diagram of a bottom view of a versatile container lid of FIG. 4, in accordance with an embodiment of the invention.

FIG. 5 is a block diagram of a bottom view of a versatile container lid 100 of FIG. 4, in accordance with an embodiment of the invention. The vertical walls 122a, 122b, 124a, and 125b are square-shaped walls that are part of the lid body 130. The vertical wall 122a has a width (dimension) of W2 and length (dimension) of L2, and the vertical wall 122b has a width (dimension) of W3 and length (dimension) of L3, where W1>W2>W3 and L1>L2>L3. The vertical wall 124a has a width (dimension) of W4 and length (dimension) of L4, and the vertical wall 124b has a width (dimension) of W5 and length (dimension) of L5, where L1>L2>L3>L4>L5 and W1>W2>W3>W4>W5, and where the lengths L1, L2, L3, L4, and L5 and the widths W1, W2, W3, W4, and W5 may be set to any suitable lengths so that the lid 100 can cover different sized containers.

The exemplary lid 100 is square in shape if W1=L1, W2=L2, W3=L3, W4=L4, and W5=L5. The exemplary lid 100 is non-square in shape or is rectangular in shape if at least W1 does not equal L1.

As shown in FIG. 5, the vertical portions 502a of the ring 120a and the vertical portions 504a of the ring 120b are all substantially parallel. The horizontal portions 502b of the ring 120a and the horizontal portions 504b of the ring 120b are all substantially parallel.

Figure 6:
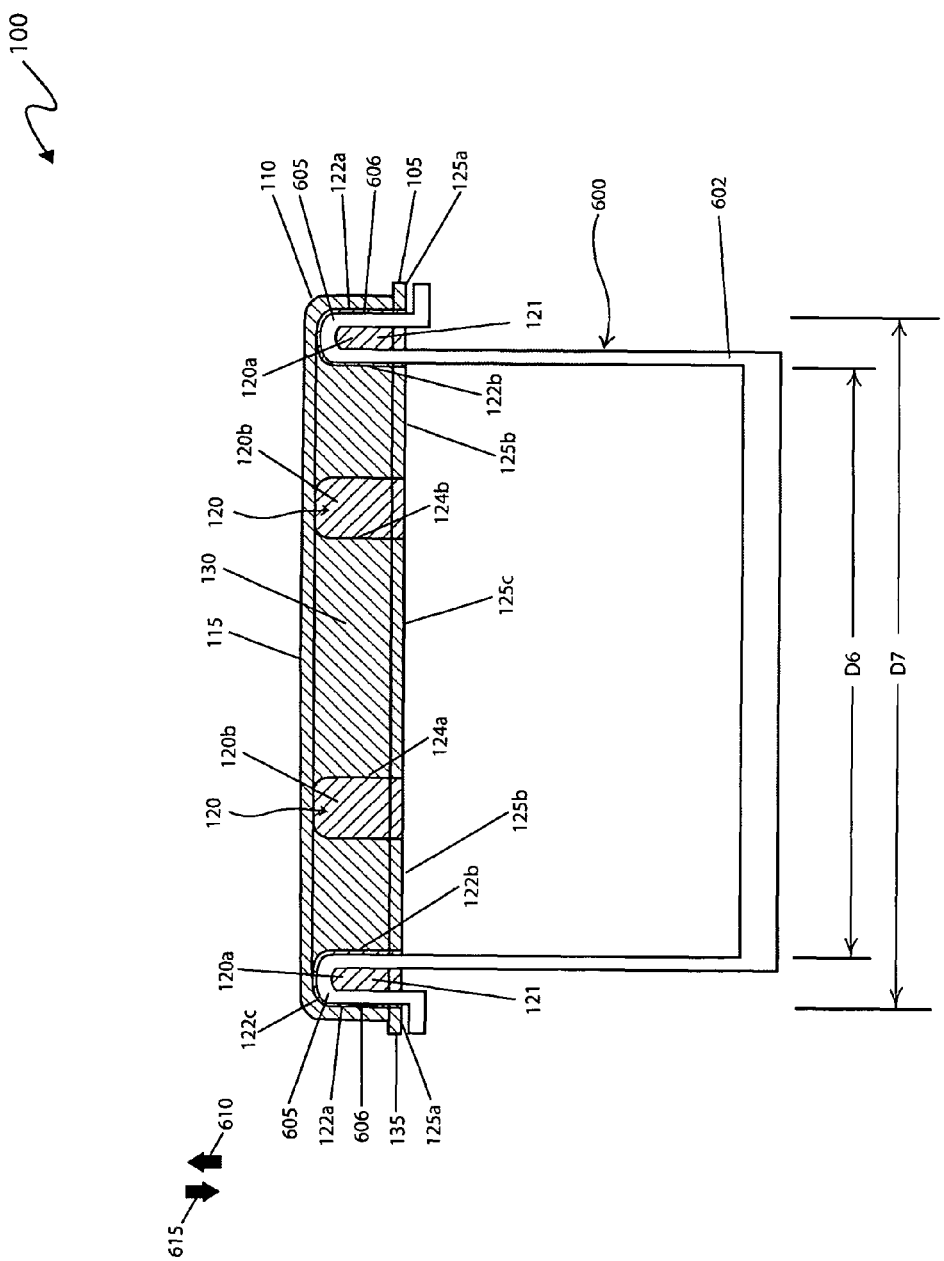
FIG. 6 is a block diagram of a cross-sectional side view of a versatile container lid removably coupled to a first container of a first size, in accordance with another embodiment of the invention.
Figure 7:
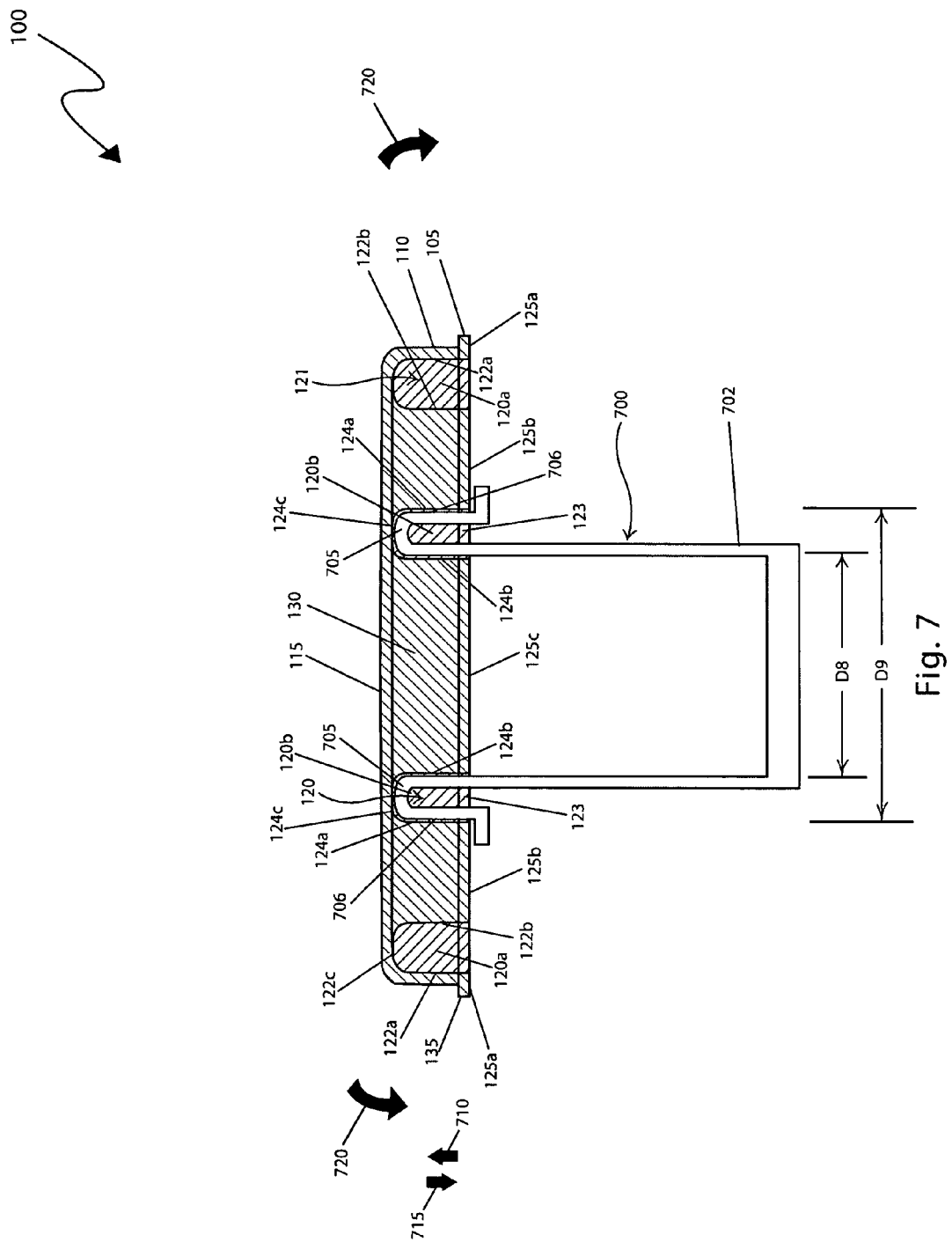
FIG. 7 is a block diagram of a cross-sectional side view of a versatile container lid removably coupled to a second container of a second size, in accordance with another embodiment of the invention.

FIG. 6 and FIG. 7 will illustrate the versatile feature of the lid 100. In particular, FIGS. 6 and 7 will illustrate the adaptability or versatility of the lid 100 to function as a cover for different sized containers (e.g., containers with different diameters or different dimensions such as different width dimensions). The containers 600 and 700 in FIGS. 6 and 7, respectively are, by way of example and not by way of limitation, food containers or other suitable types of containers used by the consumer in the kitchen or in the home.

FIG. 6 is a block diagram of a cross-sectional side view of a versatile container lid 100 removably coupled to a first container 600 of a first size D6, in accordance with another embodiment of the invention. The container 600 includes a side wall 602 that forms (surrounds) an opening of size D6 (which could be a diameter D6 if the container 600 is circular in shape or a width D6 if the container 600 is non-circular such as a square-shaped container or rectangular-shaped container). A rim 605 is formed at the end or top of the side wall 602. The rim 605 is removably inserted into the opening 121 of the ring 120a such that the rim side 606 will push against the side wall 122a and the side wall 122a will push against the rim side 606. Since the rim side 606 and the side wall 122a will push against each other, the lid 100 (and lid body 130) are removably secured on the container 600 and provide a substantially sealed cover on the container 600. The size D7 of the container 600 between the rim side 606 will be approximately equal to the size (dimension) D2 (for a circular lid 100) or to the size (dimension) W2 (for a non-circular lid 100) so that the side wall 122a and the rim side 606 will provide sufficient force against each other. The size D7 is also greater than the size (dimension) D3 (for a circular lid 100) or the size (dimension) W3 (for a non-circular lid 100) so that the rim 605 is removably insertable into the opening 121. The lid 100 is removably attached to the container 600 by pressing the lid 100 in a downward direction 610 toward the container 600 so that the rim 605 is received by the opening 121 and the rim 605 is removably contacting at least the side wall 122a of the ring 120a. Typically, the top wall 122c is also in contact with the rim 605.

The lid 100 is detached from the container 600 by pulling the lid 100 in the upward direction 615 away from the container 600, so that the rim 605 is removed from the opening 121 of the ring 120a. As a result, the lid 100 is separated from the container 600.

FIG. 7 is a block diagram of a cross-sectional side view of a versatile container lid 100 removably coupled to a second container 700 of a second size D8, in accordance with another embodiment of the invention. The container 700 includes a side wall 702 that forms (surrounds) an opening of size D8 (which could be a diameter D8 if the container 700 is circular in shape or a width D8 if the container 700 is non-circular such as a square-shaped container or rectangular-shaped container). A rim 705 is formed at the end or top of the side wall 702. The rim 705 is removably inserted into the opening 123 of the ring 120b such that the rim side 706 will push against the side wall 124a and the side wall 124a will push against the rim side 706. Since the rim side 706 and the side wall 124a will push against each other, the lid 100 (and body 130) are removably secured on the container 700 and provide a substantially sealed cover on the container 700. The size D9 of the container 700 between the rim side 706 will be approximately equal to the size (dimension) D4 (for a circular lid 100) or to the size (dimension) W4 (for a non-circular lid 100) so that the side wall 124a and the rim side 706 will provide sufficient force against each other. The size D9 is also greater than the size D5 (for a circular lid 100) or the size W5 (for a non-circular lid 100) so that the rim 705 is removably insertable into the opening 123. The lid 100 is removably attached to the container 700 by pressing the lid 100 in a downward direction 710 toward the container 700 so that the rim 705 is received by the opening 123 and the rim 705 is removably contacting at least the side wall 124a of the ring 120b. Typically, the top wall 124c is also in contact with the rim 705.

The lid 100 is detached from the container 700 by pulling the lid 100 in the upward direction 715 away from the container 700, so that the rim 705 is removed from the opening 123 of the ring 120b. As a result, the lid 100 is separated from the container 700.

In another embodiment of the invention, the lid 100 is foldable in the downward direction 720. As a result, when the lid 100 is removably coupled to the container 700, folding the lid 100 against the wall 702 will save space and will allow the lid 100 to be stored in a relatively smaller area. Therefore, the lid 100 advantageously provides saves room or space in the kitchen, kitchen cabinets, refrigerators, and/or cupboards. The foldable feature of the lid 100 will be discussed below with reference to FIG. 8 in accordance with another embodiment of the invention.

Referring to both FIGS. 6 and 7, the first container 600 is larger than the second container 700 because D7>D9 and D6>D8. Therefore, the various rings 120 (e.g., rings 120a and 120b) are configured to removably receive different sized rims of associated different sized containers and to allow the lid 100 to be used as a cover for different sized containers. The exemplary lid 100 can be used to cover a relatively larger container 600 as shown in FIG. 6 and can also be used to cover a relatively smaller container 700 as shown in FIG. 6.

As will be discussed below, in other embodiments of the invention, the lid 100 can include additional rings 120 so that the lid 100 can also be used to cover other containers that may have sizes that differ from the container 600 or container 700.

Figure 8:
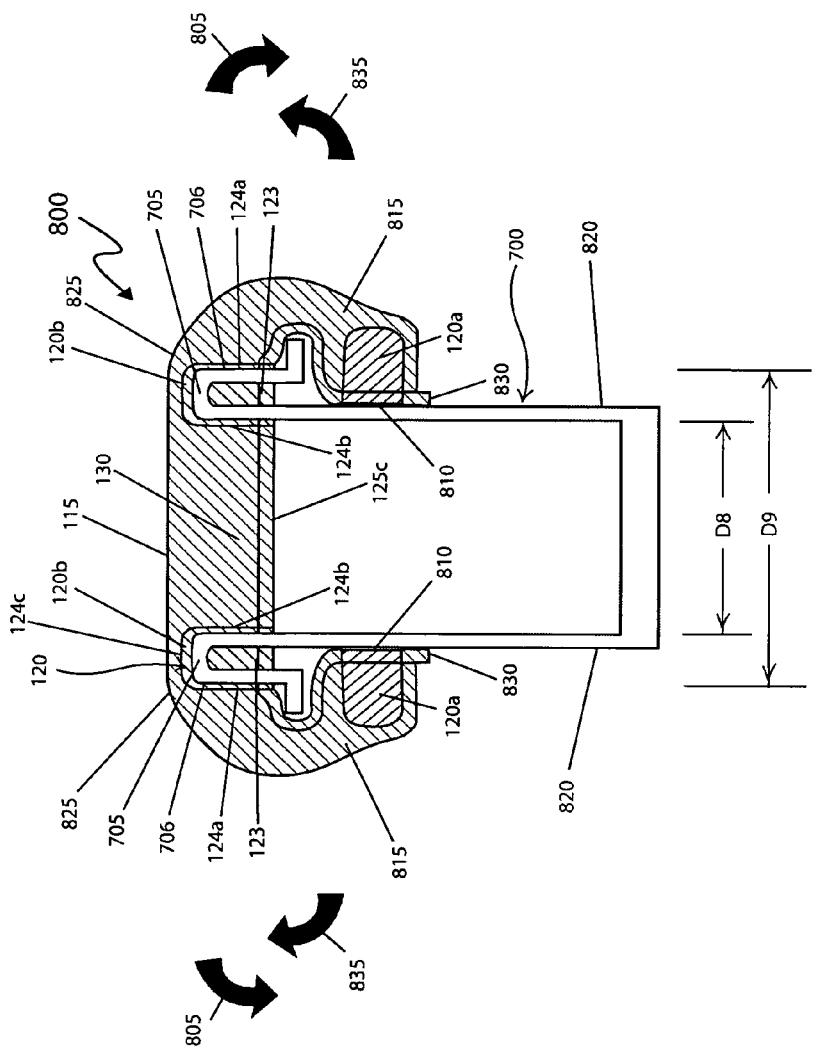
FIG. 8 is a block diagram of a cross-sectional side view of a foldable versatile container lid, in accordance with another embodiment of the invention.

FIG. 8 is a block diagram of a cross-sectional side view of a foldable versatile container lid 800 (apparatus 800), in accordance with another embodiment of the invention. The foldable lid 800 may include at least some of the features described above in the lid 100 such as, for example, a plurality of rings that are formed within the lid body 130. The lid 800 is removably attached to the container 700 in a manner as similarly described above with respect to FIG. 7. After the lid 800 is removably attached to the container 700, the lid 800 is bent in a downward direction 805 so that the bottom surface 810 of the bendable lid portion 815 is adjacent to (and/or is in contact with) the external surface 820 of the container 700. The bendable lid portion 815 is a part of the lid body 130 of the lid 800 and is disposed between the center portion 115 (that includes portion 825 which is adjacent to the ring 120b) of the lid 800 and the end portion 830 of the lid 800. The center portion 115, portion 825, bendable portion 815, and end portion 830 are part of the lid body 130. When the lid 800 is bent in the downward direction 805, the portion 815 will not be parallel to the portion 825 and center portion 115. By bending the portion 815 in the downward direction 805, the lid 800 is more compact, occupies less space, and can advantageously be stored in a relatively smaller area.

The lid 800 can be bent in the upward direction 835 so that the surface 810 is no longer adjacent with (and/or is no longer in contact with) the surface 830. As a result, the portion 815 will be substantially parallel to the portion 825 and center portion 115. The lid 800 can then be separated from the container 700 that is currently removably attached to the lid 800.

In an embodiment of the invention, the bendable portion 815 is formed from a substantially bendable material that maintains the shape that is configured for the bendable material. For example, the portion 815 may be formed from silicone (or silicone rubber or polydimethylsiloxane) or another suitable silicon polymer with rubber-like properties. As known to those skilled in the relevant art(s), silicone rubber is a polymer of silicon-containing carbon, hydrogen and oxygen. Silicone rubber has excellent insulating and temperature-resistant properties. Silicone rubber is made through a process known as vulcanization or curing of natural rubber. Silicon is injected into the long hydrocarbon chains of natural rubber through a dual-stage process under high heat and pressure, thus converting it into silicone rubber. Additionally, the cured rubber is processed with additional steps until the final marketable product is obtained. Silicone rubber maintains all of its properties even at high temperatures of approximately 300 degrees Celsius as well as at low temperatures around −55 degrees Celsius. The silicon-carbon bonds in silicone rubber are resistant to temperature fluctuations. Additionally, silicone rubber exhibits better tear strength, tensile strength, elongation and compression in comparison to natural rubber at high temperatures. To provide added rigidity to the portion 815 and decreased elasticity to the portion 815, a suitable amount of sulfur is added to the liquid rubber during the manufacturing process. If rigidity is added to (and elasticity is decreased for) the silicone used to form the portion 815, then the portion 815 can be bent in the downward direction 805 and the portion 815 will not automatically return back to its prior shape in the upward direction 835, and/or the portion 815 can be bent in the upward direction 835 and the portion 815 will not automatically return back to a prior shape in the downward direction 805. Other standard steps known to those skilled in the relevant art(s) for setting the characteristics of silicone may be used in the bendable portion 815. In an embodiment of the invention, other portions of the lid 800 (such as, for example, the portion 825 and/or center portion 115) may be formed from the same material that forms the portion 815.

Those skilled in the art will realize, after reading the discussion herein, that other suitable materials or combination of suitable materials can be used for the components in the lid 100 (or other lids discussed herein such as the lid 800). Those skilled in the art will also realize, after reading the discussion herein, that the assembly, manufacture, and/or construction of the components of the lid 100 (or other lids discussed herein such as the lid 800) may be selectively varied based on cost, ease of manufacturing, or/and other considerations. Additionally, the parts or components in the lid 100 (or other lids discussed herein such as the lid 800) can be suitably varied or substituted with other parts or components or shapes, as manufacturing and parts technologies improve in the future.

Figure 9A:
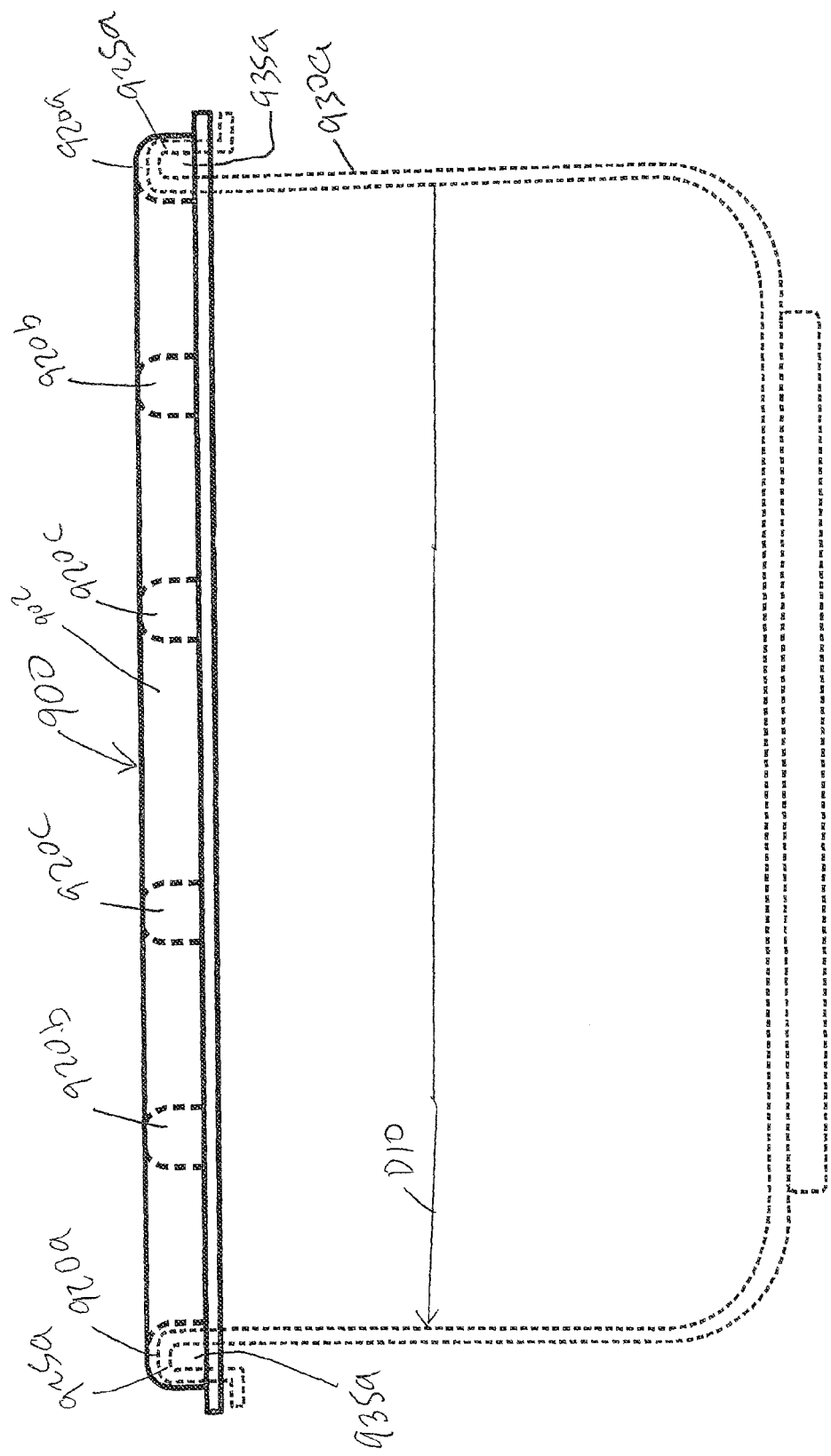
FIG. 9A is a block diagram of a side view of a versatile container lid, in accordance with another embodiment of the invention.
Figure 9B:
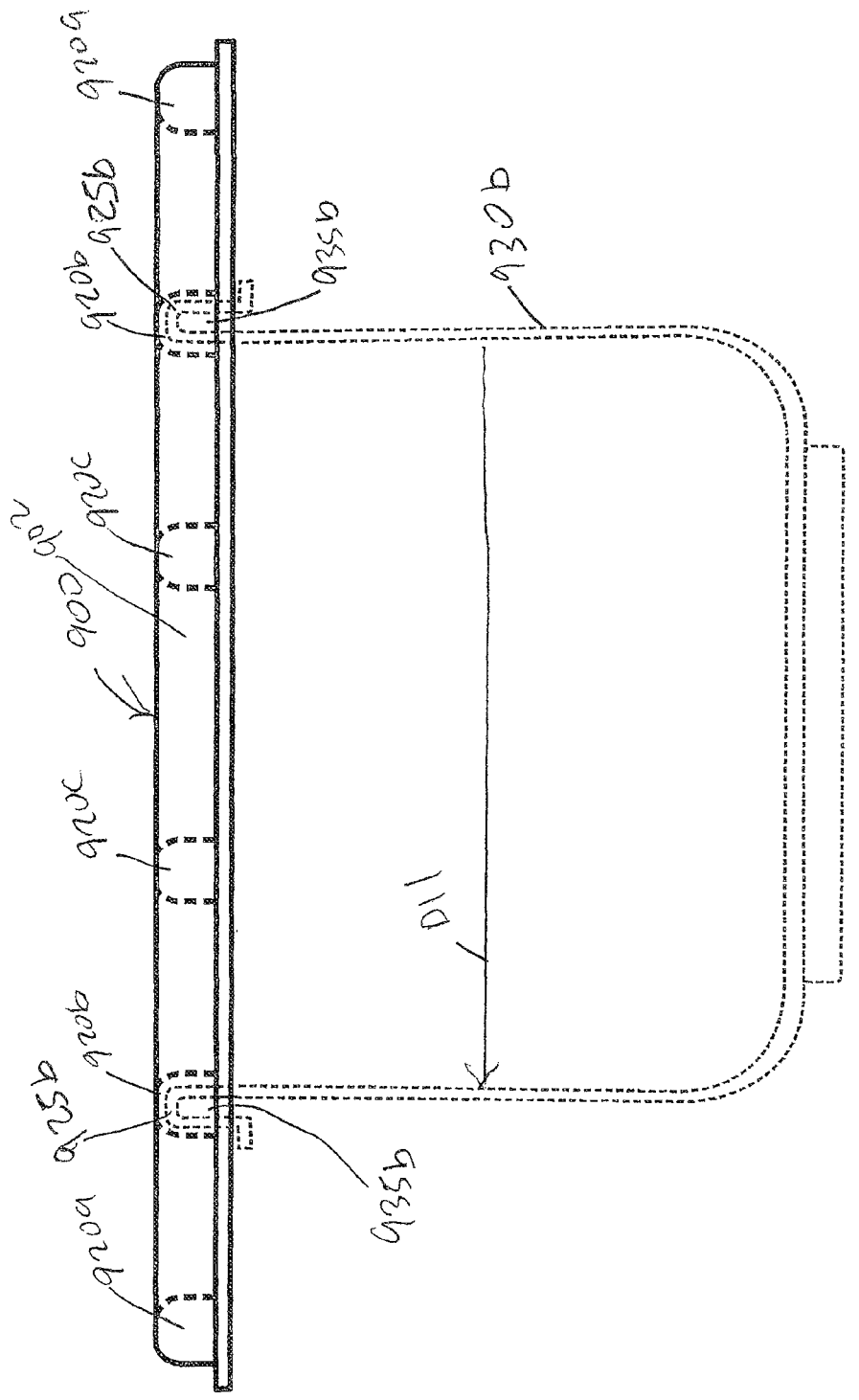
FIG. 9B is a block diagram of a side view of a versatile container lid in FIG. 9A, in accordance with an embodiment of the invention.
Figure 9C:
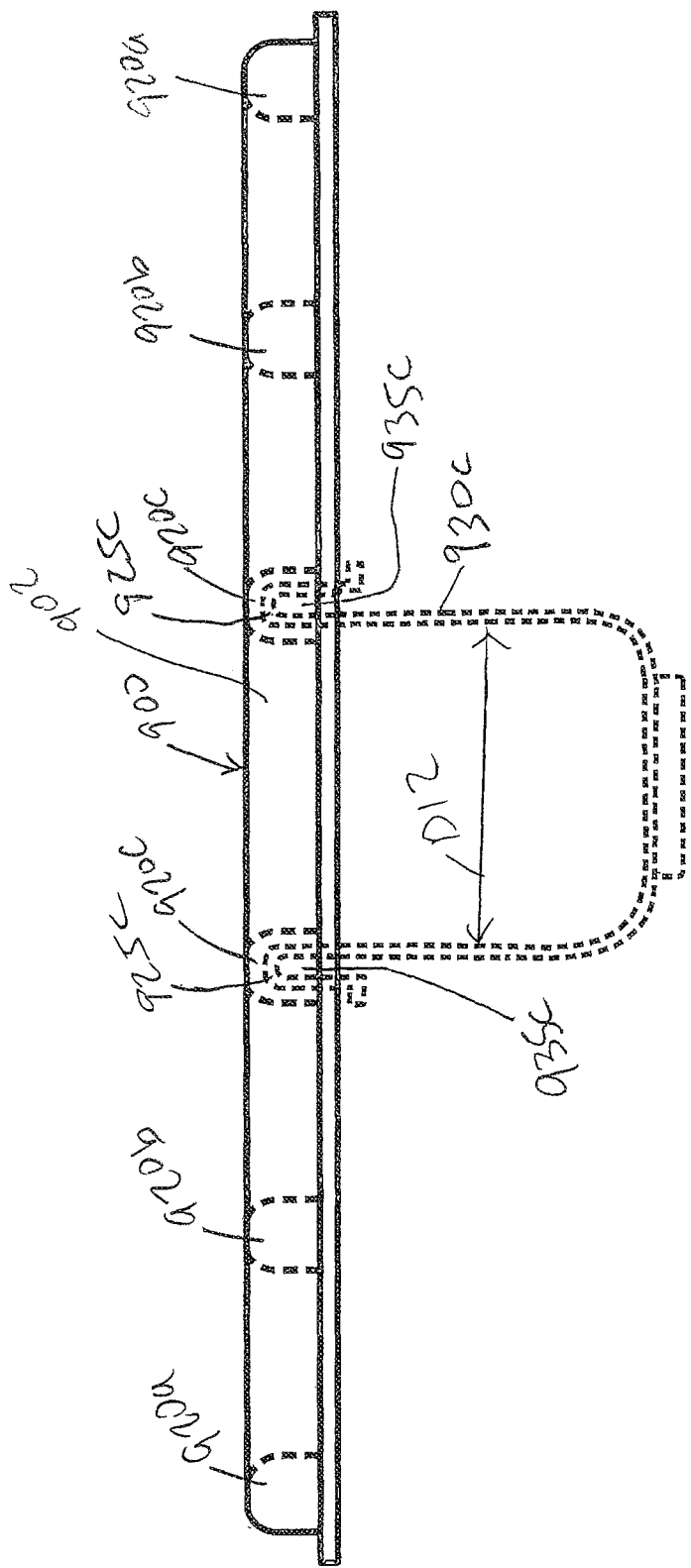
FIG. 9C is a block diagram of a side view of a versatile container lid in FIG. 9A, in accordance with an embodiment of the invention.

FIGS. 9A through 9C are block diagrams that illustrate the additional versatile features of a versatile container lid in accordance with another embodiment of the invention. FIG. 9A is a block diagram of a side view of a versatile container lid 900, in accordance with an embodiment of the invention. The lid 900 may include the various features of the lid 100 and/or the lid 800 as described with reference to FIGS. 1 and 8, respectively. The lid 900 includes a plurality of rings 920a, 920b, and 920c, where all of the rings 920a through 920c are formed in the lid body 902. As mentioned above, the number of rings may vary in a lid according to various embodiments of the invention. The rim 925a of a container 930a is removably inserted in an opening 935a of the ring 920a. Therefore, the container 930a is removably coupled to the lid 900. The container 930a has a dimension D10 (e.g., diameter or width) that can be of any suitable size.

FIG. 9B is a block diagram of a side view of a versatile container lid 900 in FIG. 9A, in accordance with an embodiment of the invention. The rim 925b of a container 930b is removably inserted in an opening 935b of the ring 920b. Therefore, the container 930b is removably coupled to the lid 900. The container 930b has a dimension nil (e.g., diameter or width) that can be of any suitable size.

FIG. 9C is a block diagram of a side view of a versatile container lid 900 in FIG. 9A, in accordance with an embodiment of the invention. The rim 925c of a container 930c is removably inserted in an opening 935c of the ring 920c. Therefore, the container 930c is removably coupled to the lid 900. The container 930c has a dimension D12 (e.g., diameter or width) that can be of any suitable size. Since the sizes of the containers 930a, 930b, and 930c are each different from each other (e.g., D10>D11>D12), the lid 900 has the advantageous versatile feature of being able to cover various containers of different sizes. In another embodiment of the invention, the lid 900 may have the bendable lid features of the lid 800 in FIG. 8.

Figure 10B:
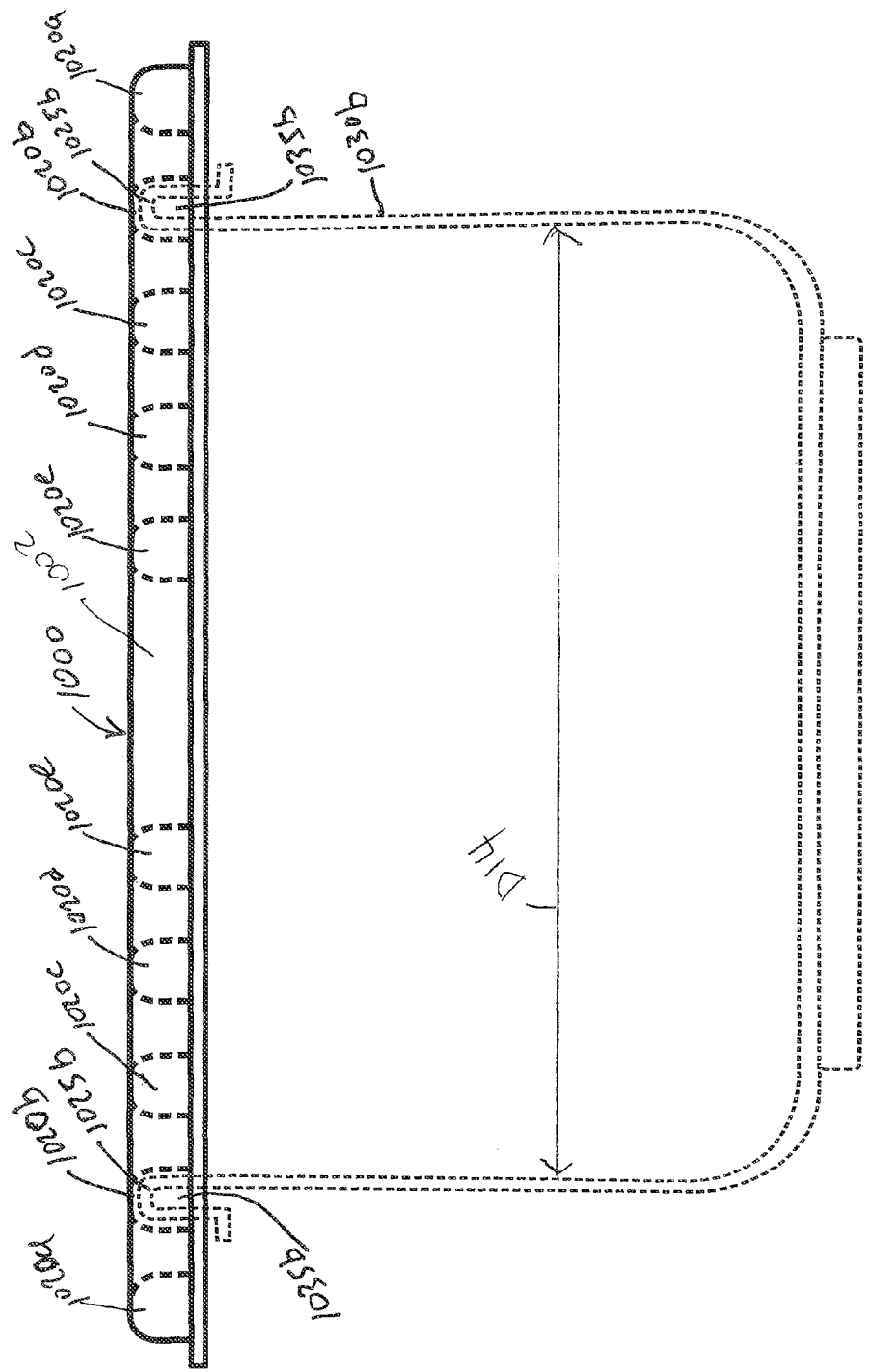
FIG. 10B is a block diagram of a side view of a versatile container lid in FIG. 10A, in accordance with an embodiment of the invention.

FIGS. 10A through 10E are block diagrams that illustrate the additional versatile features of a versatile container lid in accordance with another embodiment of the invention. FIG. 10A is a block diagram of a side view of a versatile container lid 1000, in accordance with an embodiment of the invention. The lid 1000 may include the various features of the lid 100 and/or the lid 800 as described with reference to FIGS. 1 and 8, respectively. The lid 1000 includes a plurality of rings 1020a, 1020b, 1020c, 1020d, and 1020e, where the rings 1020a through 1020e are formed within the lid body 1002. As mentioned above, the number of rings may vary in a lid according to various embodiments of the invention. The rim 1025a of a container 1030a is removably inserted in an opening 1035a of the ring 1020a. Therefore, the container 1030a is removably coupled to the lid 1000. The container 1030*a* has a dimension D13 (e.g., diameter or width) that can be of any suitable size.

FIG. 10B is a block diagram of a side view of a versatile container lid 1000 in FIG. 10A, in accordance with an embodiment of the invention. The rim 1025*b* of a container 1030*b* is removably inserted in an opening 1035*b* of the ring 1020*b*. Therefore, the container 1030*b* is removably coupled to the lid 1000. The container 1030*b* has a dimension D14 (e.g., diameter or width) that can be of any suitable size.

Figure 10C:
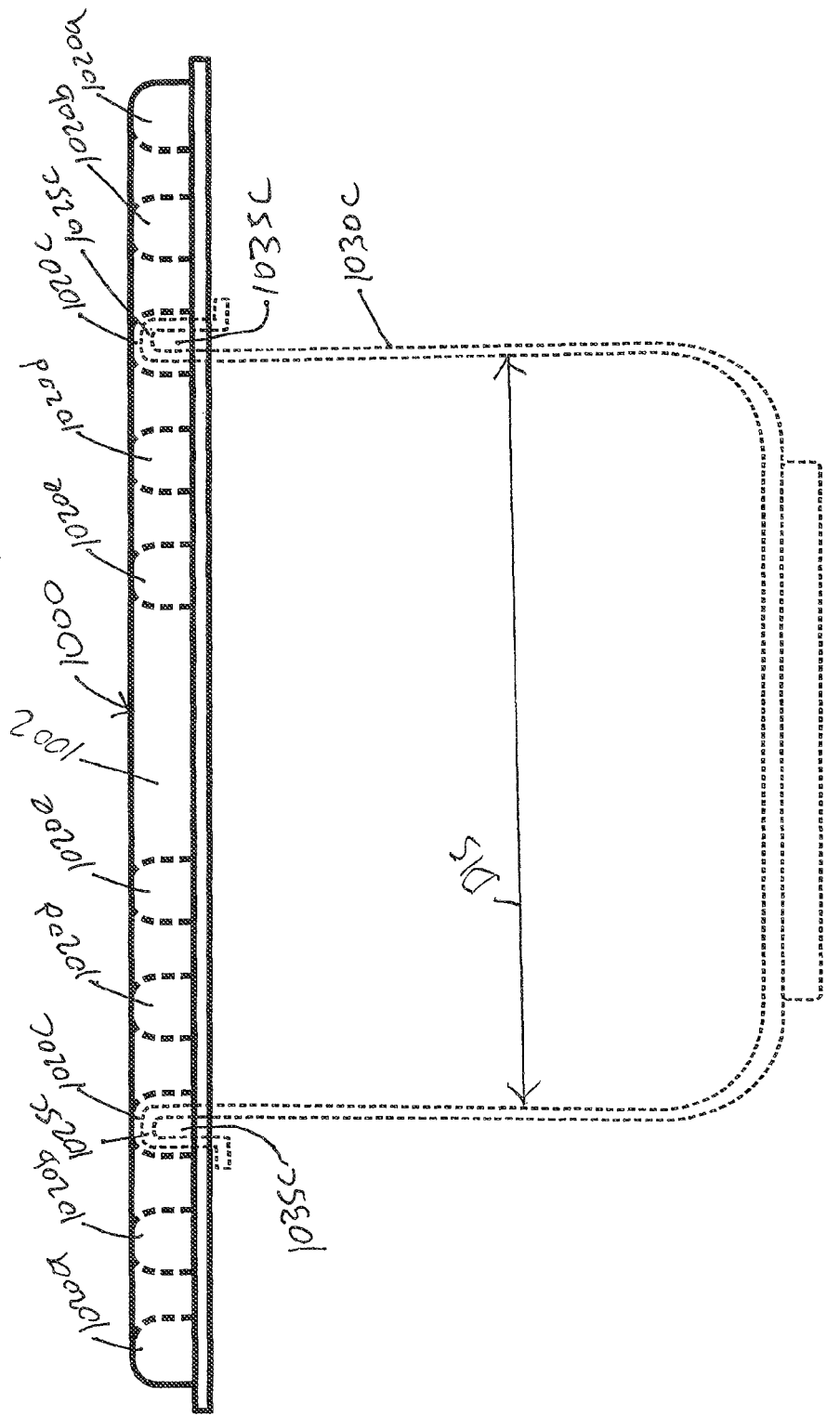
FIG. 10C is a block diagram of a side view of a versatile container lid in FIG. 10A, in accordance with an embodiment of the invention.

FIG. 10C is a block diagram of a side view of a versatile container lid 1000 in FIG. 10A, in accordance with an embodiment of the invention. The rim 1025*c* of a container 1030*c* is removably inserted in an opening 1035*c* of the ring 1020*c*. Therefore, the container 1030*c* is removably coupled to the lid 1000. The container 1030*c* has a dimension D15 (e.g., diameter or width) that can be of any suitable size.

Figure 10D:
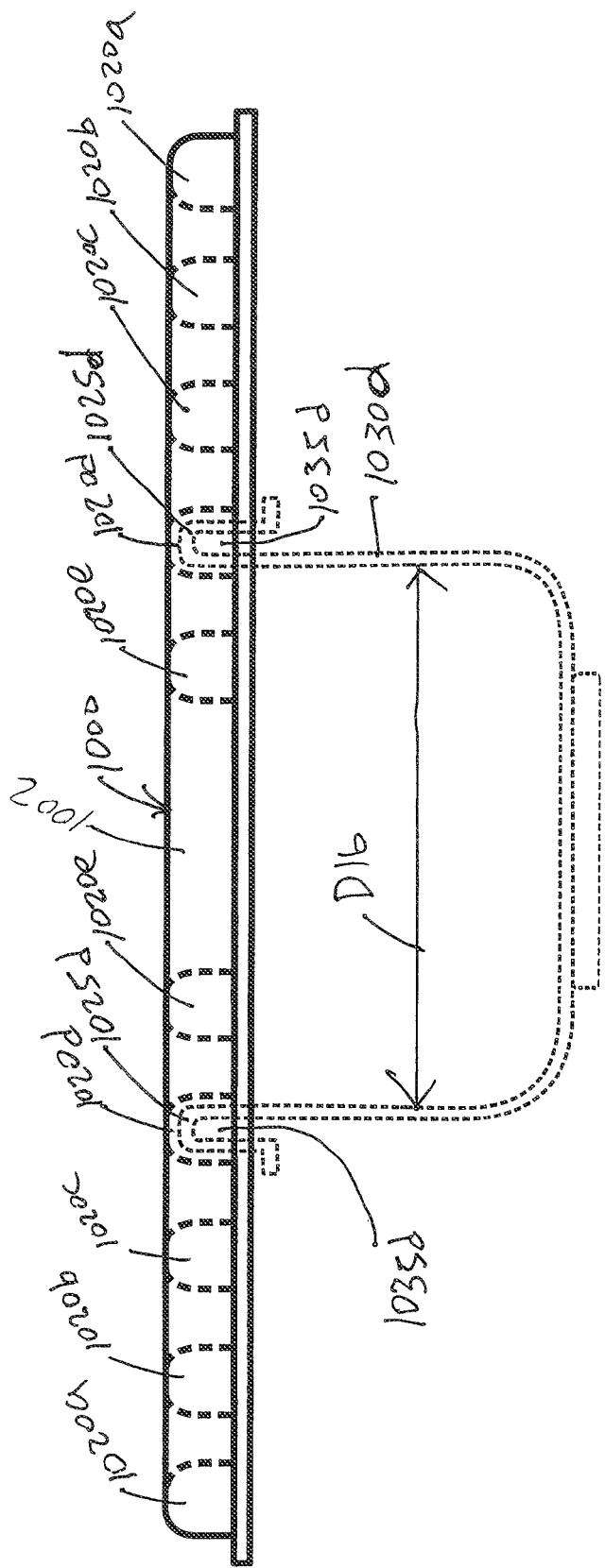
FIG. 10D is a block diagram of a side view of a versatile container lid in FIG. 10A, in accordance with an embodiment of the invention.

FIG. 10D is a block diagram of a side view of a versatile container lid 1000 in FIG. 10A, in accordance with an embodiment of the invention. The rim 1025*d* of a container 1030*d* is removably inserted in an opening 1035*d* of the ring 1020*d*. Therefore, the container 1030*d* is removably coupled to the lid 1000. The container 1030*d* has a dimension D16 (e.g., diameter or width) that can be of any suitable size.

Figure 10E:
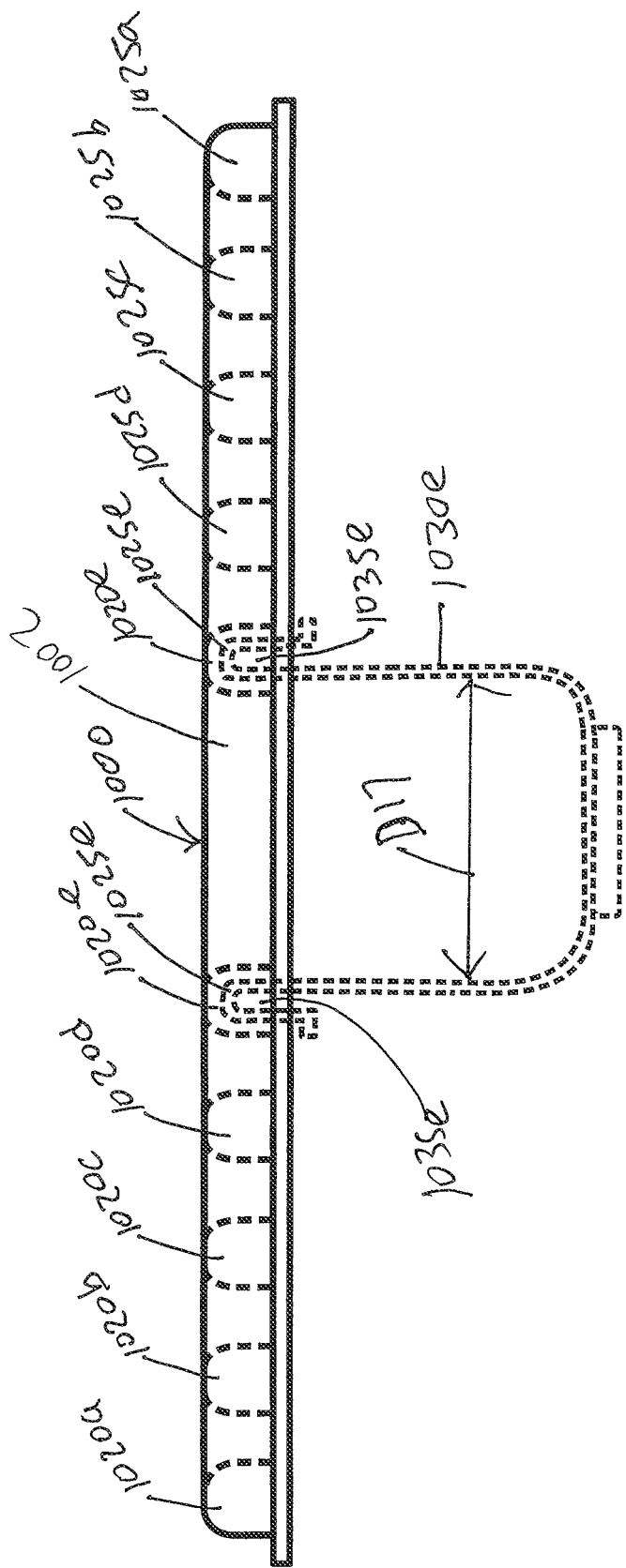
FIG. 10E is a block diagram of a side view of a versatile container lid in FIG. 10A, in accordance with an embodiment of the invention.

FIG. 10E is a block diagram of a side view of a versatile container lid 1000 in FIG. 10A, in accordance with an embodiment of the invention. The rim 1025*e* of a container 1030*e* is removably inserted in an opening 1035*e* of the ring 1020*e*. Therefore, the container 1030*e* is removably coupled to the lid 1000. The container 1030*e* has a dimension D17 (e.g., diameter or width) that can be of any suitable size. Since the sizes (dimensions) of the containers 1030*a*, 1030*b*, 1030*c*, 1030*d*, and 1030*e* are each different from each other (e.g., D13>D14>D15>D16>D17), the lid 1000 has the advantageous versatile feature of being able to cover various containers of different sizes. In another embodiment of the invention, the lid 1000 may have the bendable lid features of the lid 800 in FIG. 8.

Figure 11:
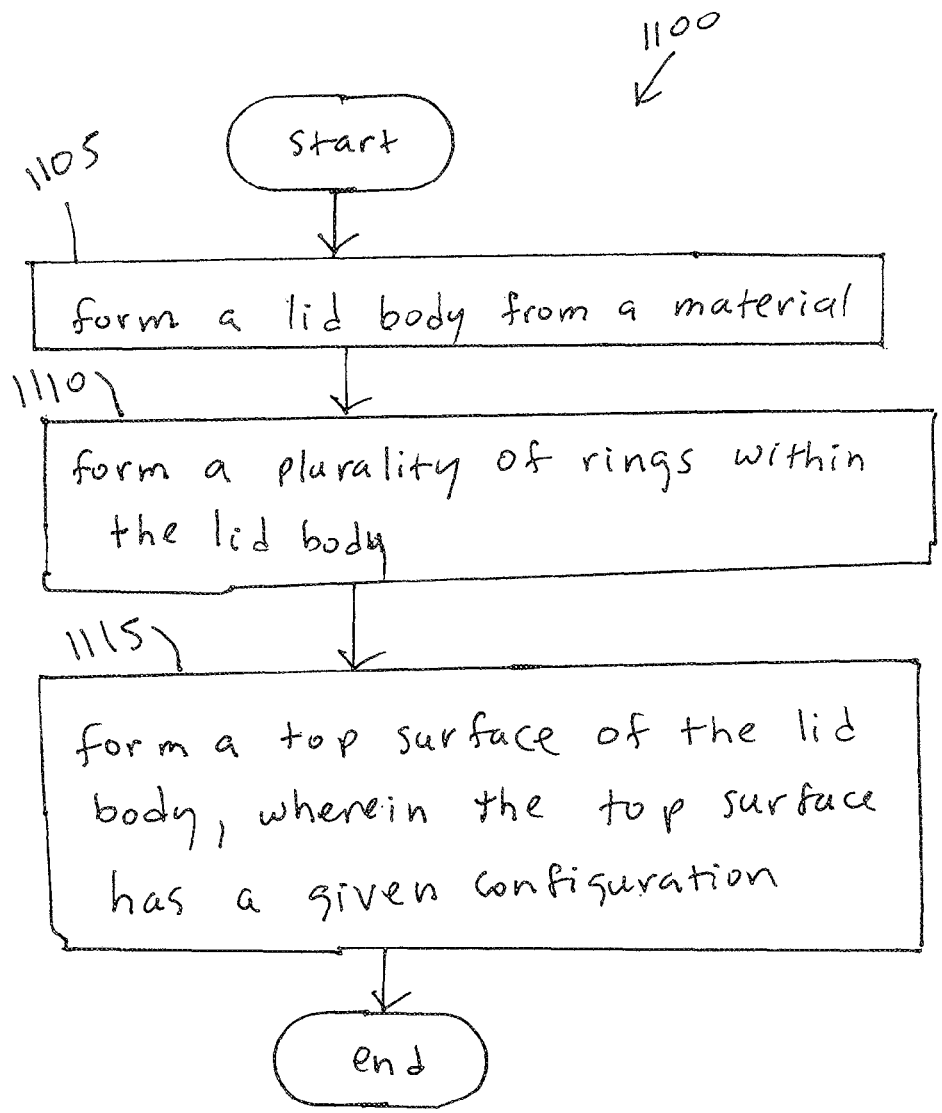
FIG. 11 is a flow diagram of a method for manufacturing a versatile container lid, in accordance with an embodiment of the invention.

FIG. 11 is a flow diagram of a method 1100 for manufacturing a versatile container lid in accordance with an embodiment of the invention. The blocks in method 1100 (and/or steps in the blocks in method 1100) may vary in order or sequence than those shown in FIG. 11. For example, the steps in blocks 1110 and 1115 may be switched in sequence or order.

In block 1105, a lid body (e.g., lid body 130) is formed from a material. Various suitable materials for a lid are discussed above. In block 1110, two or more rings (i.e., a plurality of rings) are formed within the lid body. The number of rings in the lid may vary. In block 1115, a top surface of the lid body is formed, wherein the top surface has a given configuration. Exemplary configurations for the top surface are discussed above with reference to FIG. 1. Additional steps in the method 1100 may be added as previously discussed above.

One or more of the features of the lids (e.g., lids 100 or 800) disclosed above in FIGS. 1 through 11 (and accompanying text for FIGS. 1 through 11) may also be incorporated as features included in the embodiments of the lid 1200 discussed below in FIGS. 12 through 23. For example, any of the embodiments disclosed in FIGS. 12 through 23 may comprise a versatile container lid 1200 that is bendable upwards and bendable downwards as similarly discussed above for the lid shown in FIGS. 7 and 8 which disclose a bendable versatile container lid 100 or lid 800.

Figure 12:
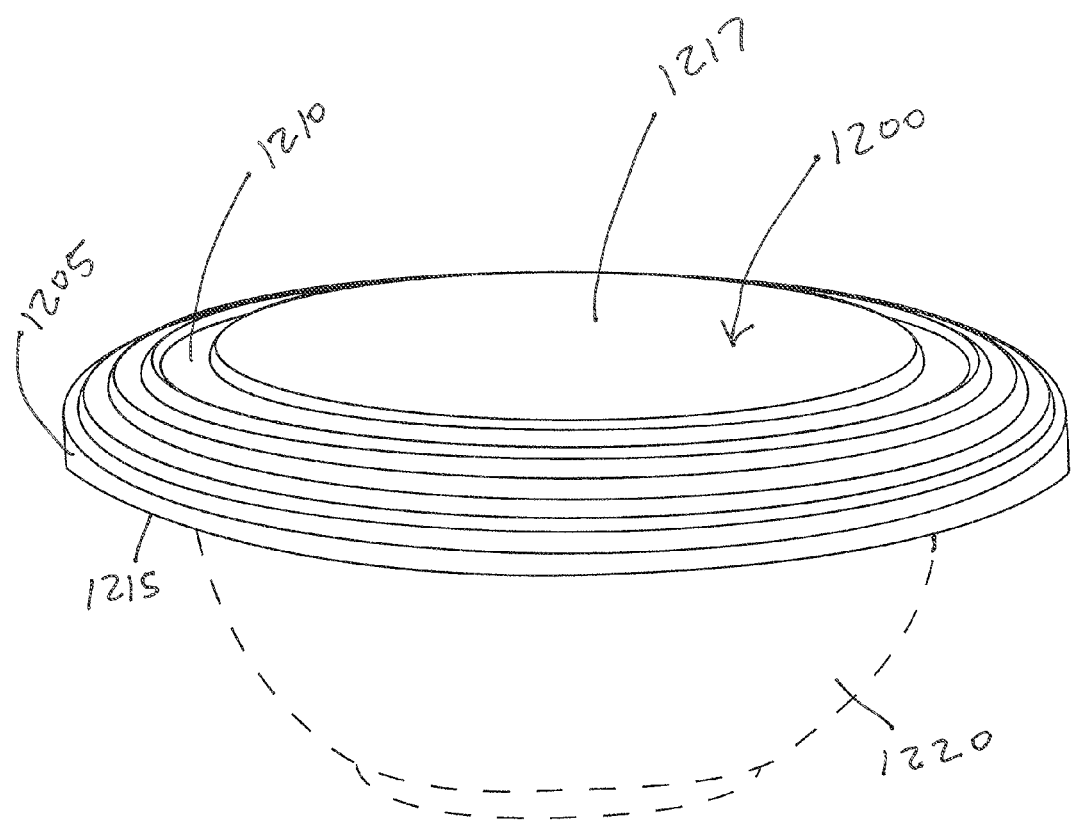
FIG. 12 is a block diagram of a front perspective view of a versatile container lid, in accordance with an embodiment of the invention.

FIG. 12 is a block diagram of a front perspective view of a versatile container lid 1200 (apparatus 1200), in accordance with an embodiment of the invention. The lid 1200 includes a body 1205 with a top surface 1210 and a bottom surface 1215. The top surface 1210 may include a top bump 1217 (or protruding member 1217) that is formed directly on the top surface 1210. In another embodiment of the invention, the top bump 1217 is omitted and, therefore, in this other embodiment of the invention, the top surface 1210 is planar or flat in configuration. A container 1220 is removably attached to the lid 1200. Two components are removably attached (or removably coupled or removably secured) means that two different components can be attached together or detached apart. The details of the lid 1200 are discussed further below.

Other variations in the components of the lid 1200 are possible in other embodiments of the invention.

Figure 13:
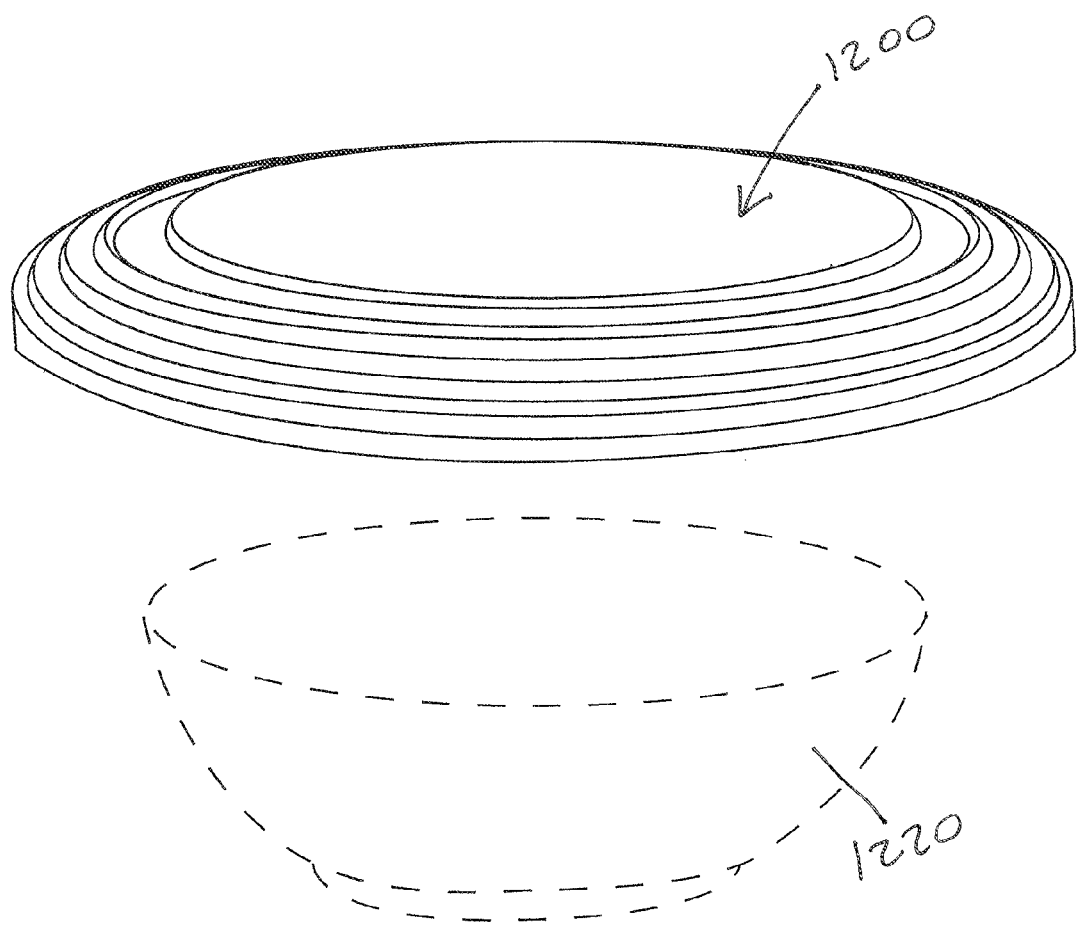
FIG. 13 is a block diagram of a front perspective view of a versatile container lid, in accordance with an embodiment of the invention, wherein a container is detached or separated from the lid.

FIG. 13 is a block diagram of a front perspective view of a versatile container lid 1200, in accordance with an embodiment of the invention, wherein a container 1220 is detached or separated from the lid 1200.

Figure 14:
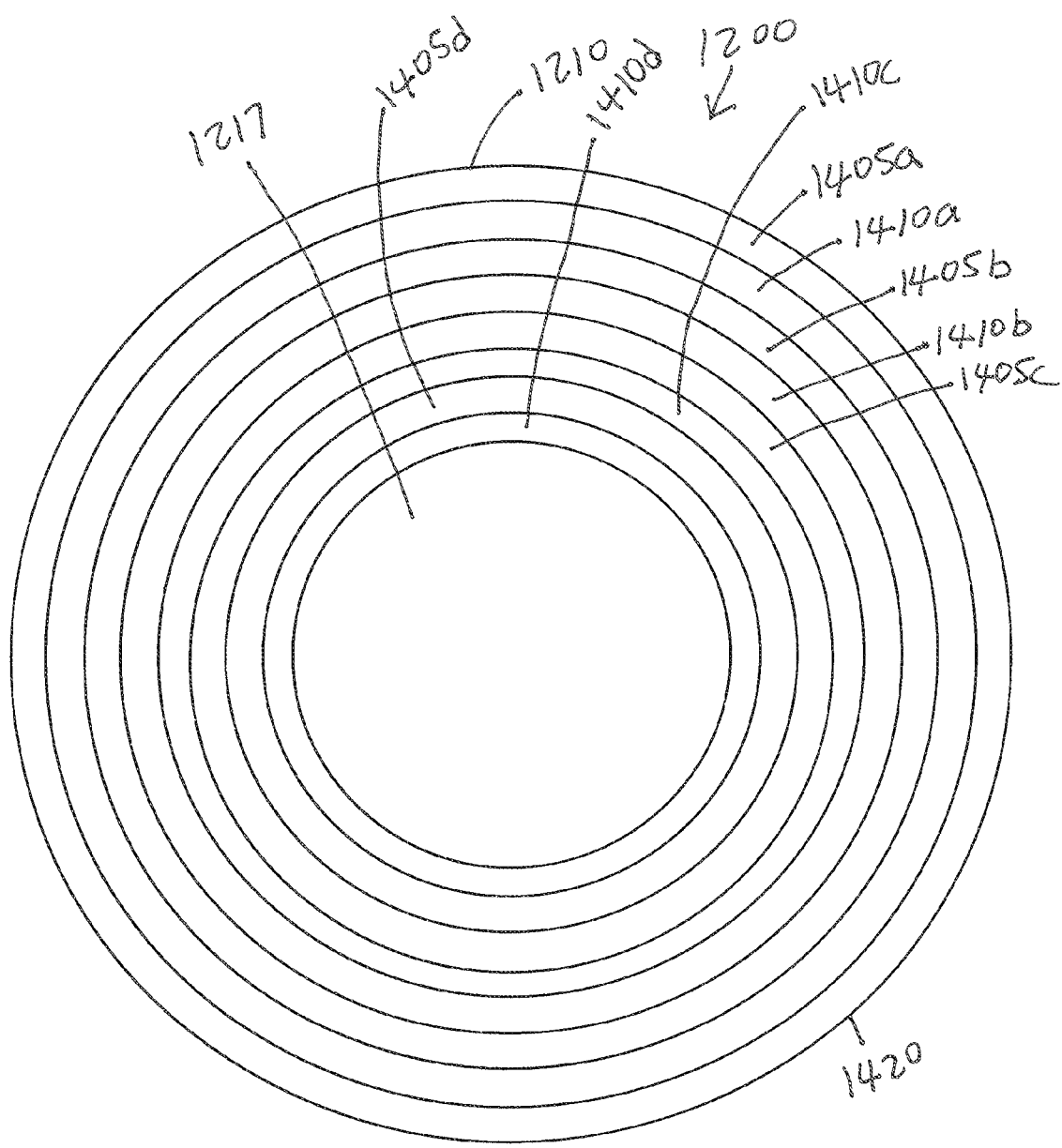
FIG. 14 is a block diagram of a top plan view of a versatile container lid, in accordance with an embodiment of the invention.

FIG. 14 is a block diagram of a top view of a versatile container lid 1200, in accordance with an embodiment of the invention. The top surface 1210 of the lid 1200 includes a plurality of peaks 1405*a*, 1405*b*, 1405*c*, and 1405*d* and a plurality of valleys 1410*a*, 1410*b*, 1410*c*, and 1410*d*. The peaks 1405*a*-1405*d* and valleys 1410*a*-1410*d* are concentric with each other. The peak 1405*a* formed at the outer edge 1420 of the lid 1200. The valley 1410*a* is between the peaks 1405*a* and 1405*b*. The peak 1405*b* is between the valleys 1410*a* and 1410*b*.

The valley 1410*b* is between the peaks 1405*b* and 1405*c*. The peak 1405*c* is between the valleys 1410*b* and 1410*c*.

The valley 1410*c* is between the peaks 1405*c* and 1405*d*. The peak 1405*d* is between the valleys 1410*c* and 1410*d*.

The valley 1410*c* is between the peak 1405*d* and the top bump 1217.

Each valley 1410*a*-1410*d* is lower in height the each peak 1405*a*-1405*d*.

Figure 15:
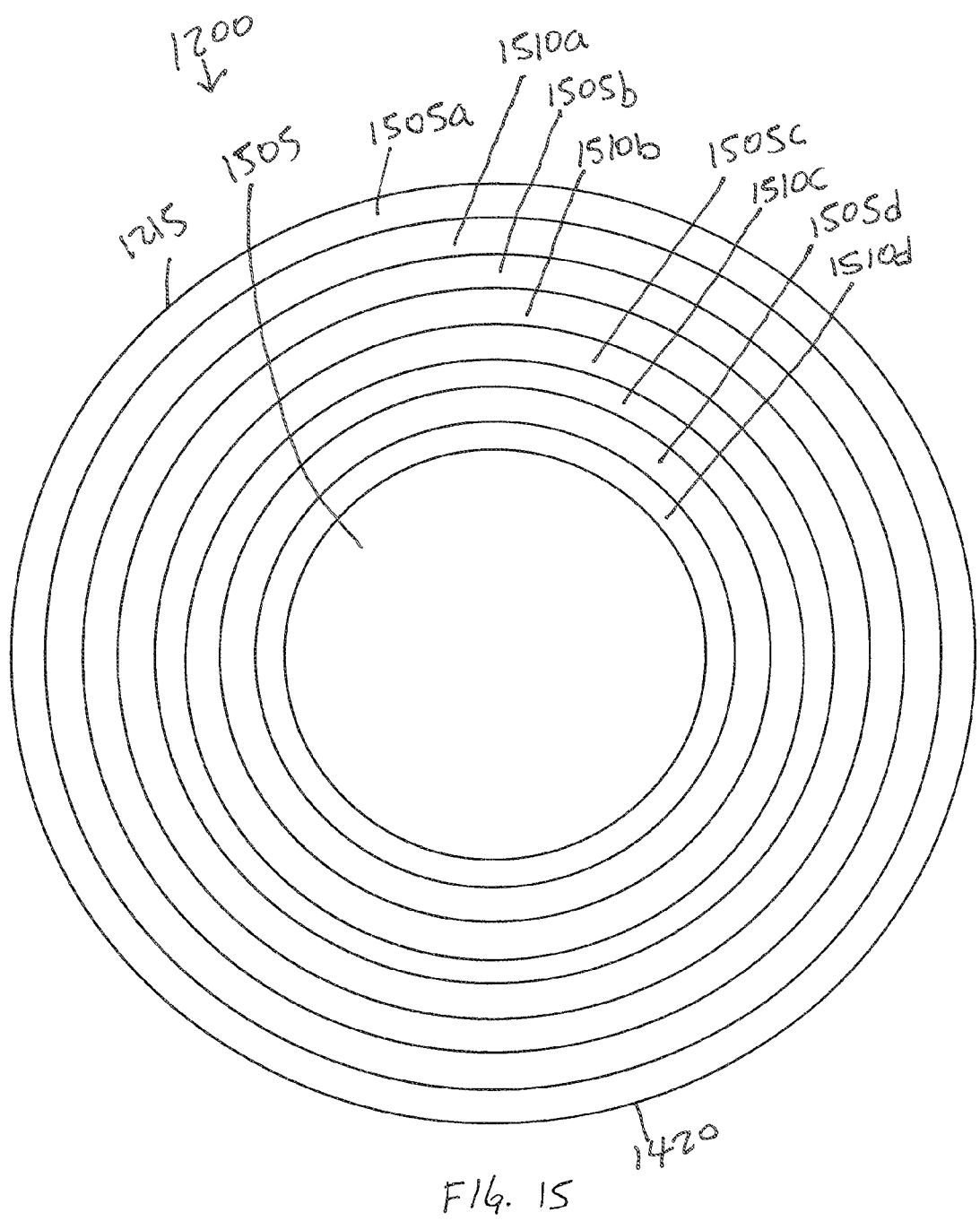
FIG. 15 is a block diagram of a bottom plan view of a versatile container lid, in accordance with an embodiment of the invention.

FIG. 15 is a block diagram of a bottom view of a versatile container lid 1200, in accordance with an embodiment of the invention. The bottom surface 1505 of the top bump 1217 is shown on the bottom surface 1215 of the lid 1200. The bottom surface 1505 includes the bottom surfaces 1505*a*, 1505*b*, 1505*c*, and 1505*d* of the peaks 1405*a*, 1405*b*, 1405*c*, and 1405*d*, respectively. The bottom surface 1505 also includes the bottom surfaces 1510*a*, 1510*b*, 1510*c*, and 1510*d* of the valleys 1410*a*, 1410*b*, 1410*c*, and 1410*d*, respectively.

Figure 16:
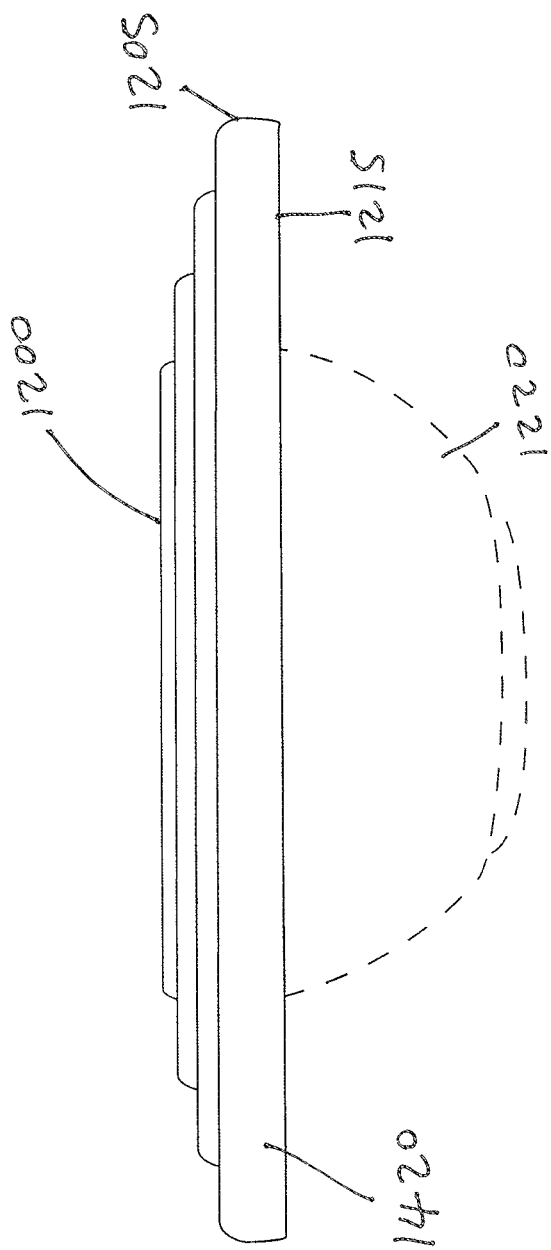
FIG. 16 is a block diagram of a side elevational view of a versatile container lid, in accordance with an embodiment of the invention, wherein a container of a first size is attached to the lid.

FIG. 16 is a block diagram of a side view of a versatile container lid 1200, in accordance with an embodiment of the invention, wherein a container 1220 of a first size is attached to the bottom surface 1215 of the lid 1200.

Figure 17:
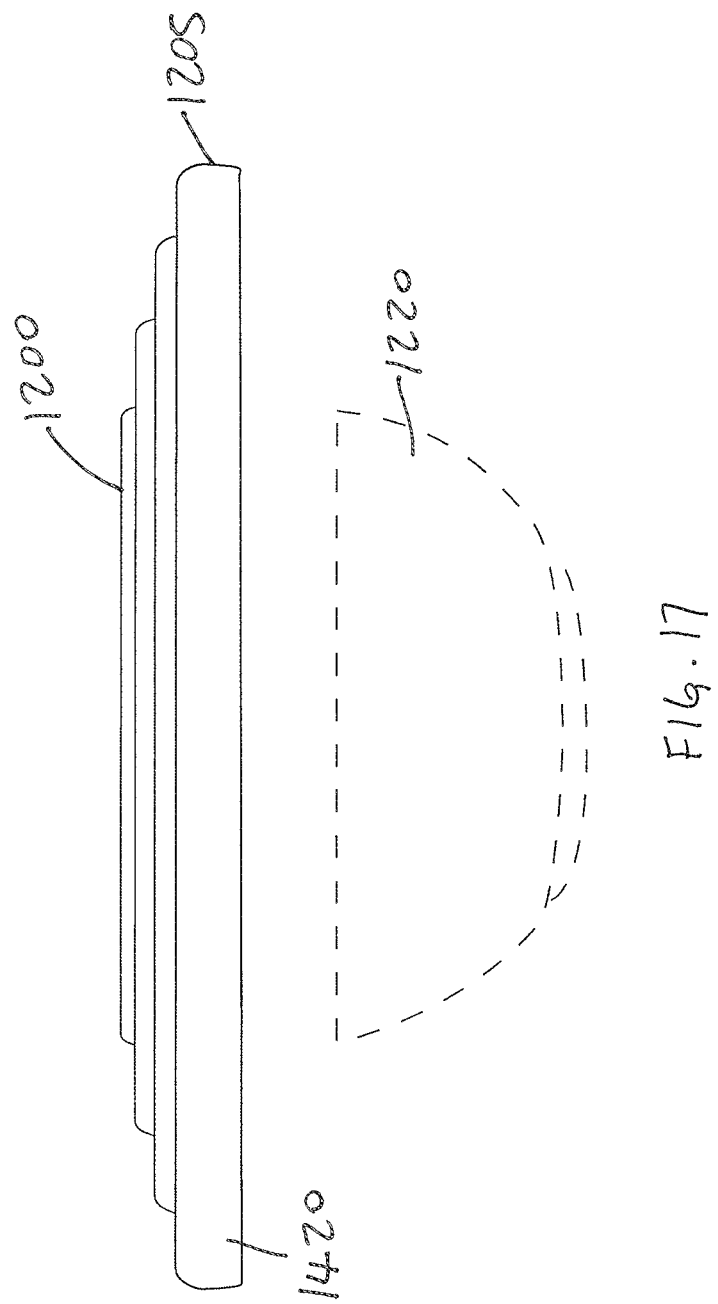
FIG. 17 is a block diagram of a side elavational view of a versatile container lid, in accordance with an embodiment of the invention, wherein a container of a first size is detached or separated from the lid.

FIG. 17 is a block diagram of a side view of a versatile container lid 1200, in accordance with an embodiment of the invention, wherein a container 1220 of a first size is detached or separated from the lid 1220.

Figure 18:
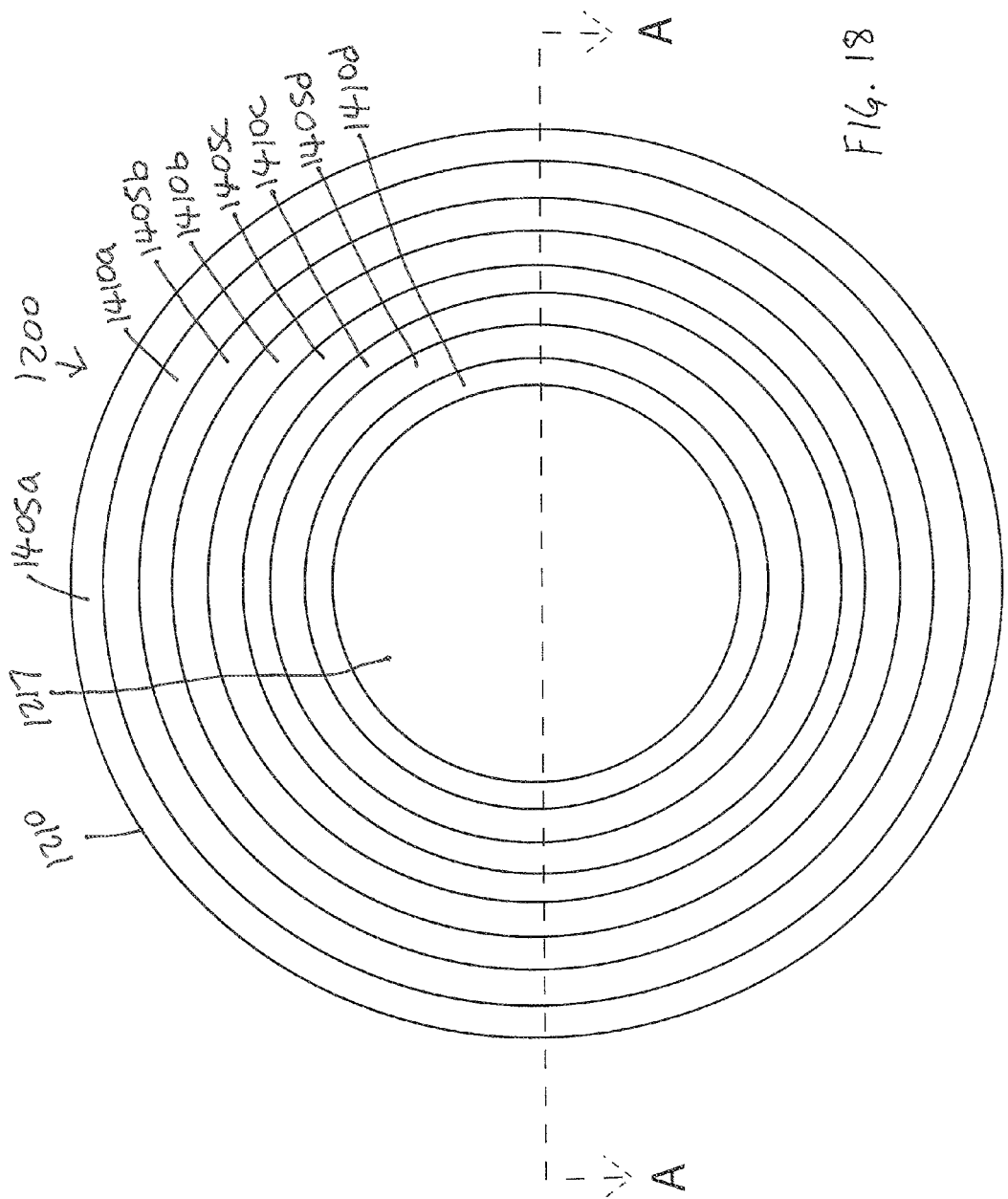
FIG. 18 is a block diagram of a top plan view of a versatile container lid, in accordance with an embodiment of the invention.

FIG. 18 is a block diagram of a top view of a versatile container lid 1200, in accordance with an embodiment of the invention. The reference arrows A-A are shown in FIG. 18 as the boundary of the cross-sectional views of FIGS. 19-23 below.

Figure 19:
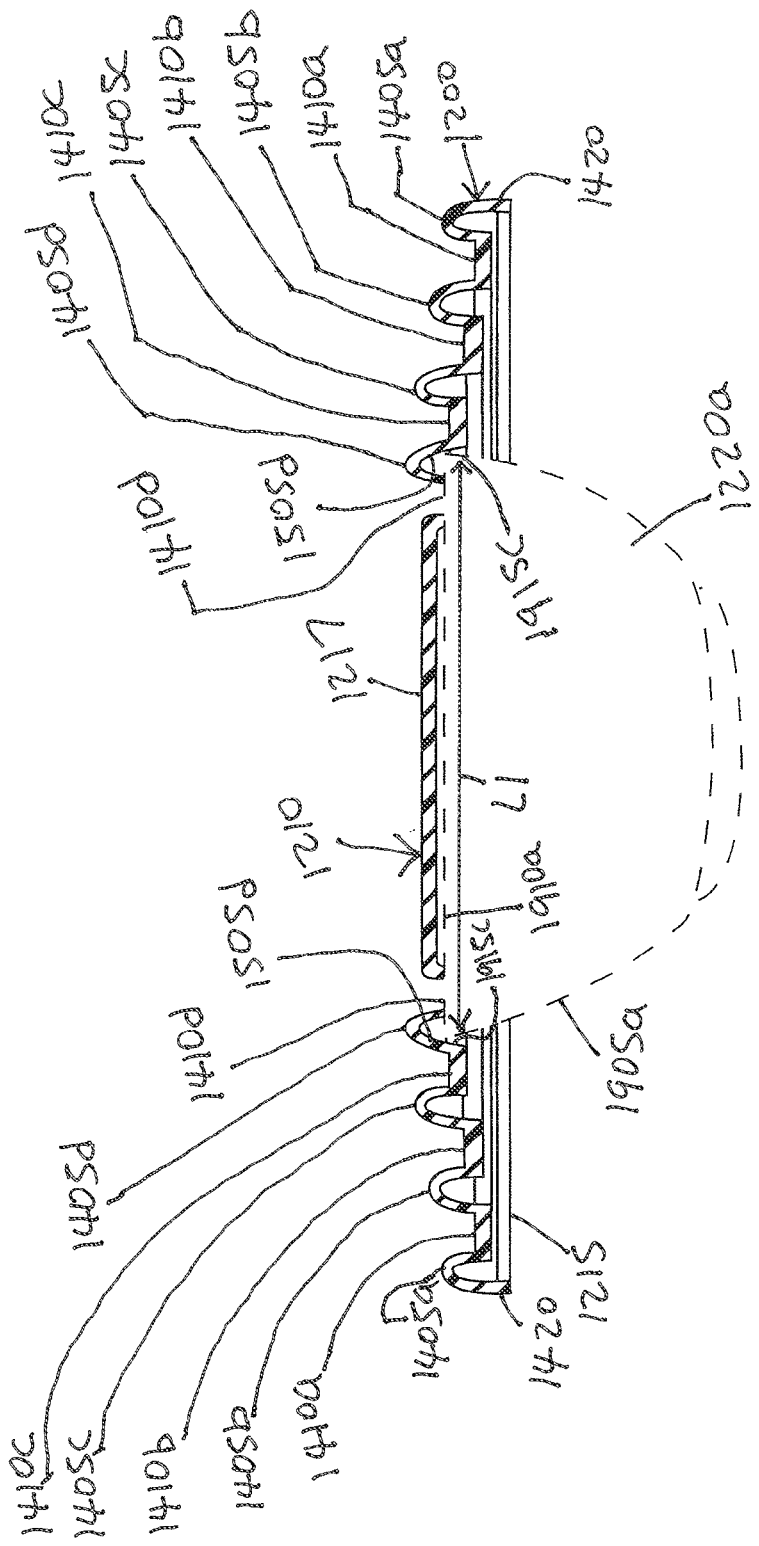
FIG. 19 is a block diagram of a cross-sectional side view of a versatile container lid, in accordance with an embodiment of the invention, wherein a container of a first size is attached to the lid.

FIG. 19 is a block diagram of a cross-sectional side view of a versatile container lid 1200, in accordance with an embodiment of the invention, wherein a container 1220*a* of a first size L1 (e.g., maximum diameter L1) is attached to the bottom surface 1215 of the lid 1200. The wall 1905*a* of the container 1220*a* is in contact with the bottom surface 1505*d* of the peak 1405*d* and side surface 1915*c* of the valley 1410*c*, and therefore, the rim 1910*a* and wall 1905*a* of the container 1220*a* is removably in contact with and secured against the bottom surface 1505*d* of the peak 1405*d* and side surface 1915*c* of the valley 1410*c*.

In the discussion herein, the containers sizes L1, L2, L3, and L4 are as follows: L1<L2<L3<L4.

Figure 20:
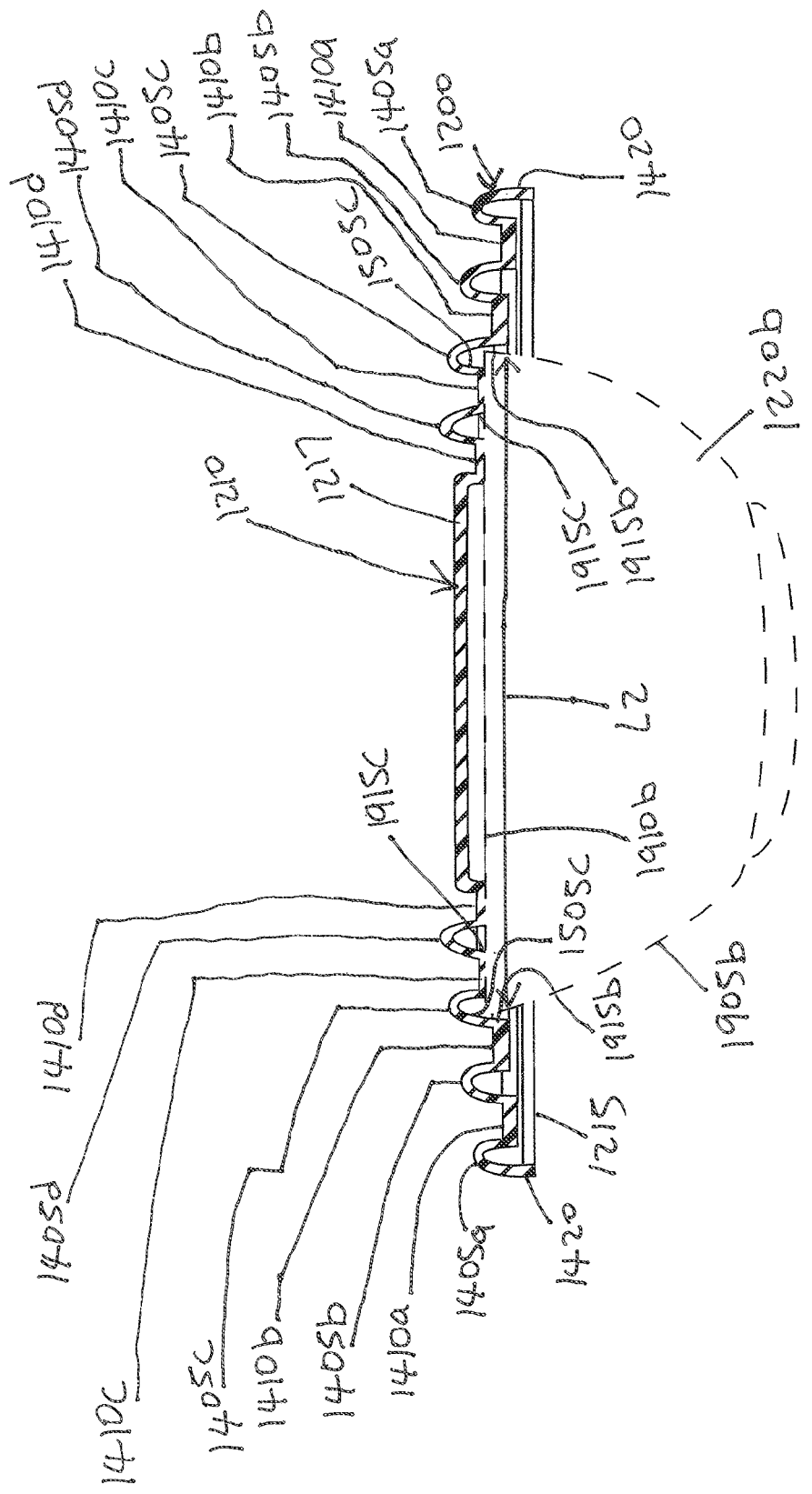
FIG. 20 is a block diagram of a cross-sectional side view of a versatile container lid, in accordance with an embodiment of the invention, wherein a container of a second size is attached to the lid.

FIG. 20 is a block diagram of a cross-sectional side view of a versatile container lid 1200, in accordance with an embodiment of the invention, wherein a container 1220*b* of a second size L2 (e.g., maximum diameter L2) is attached to the bottom surface 1215 of the lid 1200. The wall 1905*b* of the container 1220*b* is in contact with the bottom surface 1505*c* of the peak 1405*c* and side surface 1915*b* of the valley 1410*b*, and therefore, the rim 1910*b* and wall 1905*b* of the container 1220*b* is removably in contact with and secured against the bottom surface 1505*c* of the peak 1405*c* and side surface 1915*b* of the valley 1410*b*.

Figure 21:
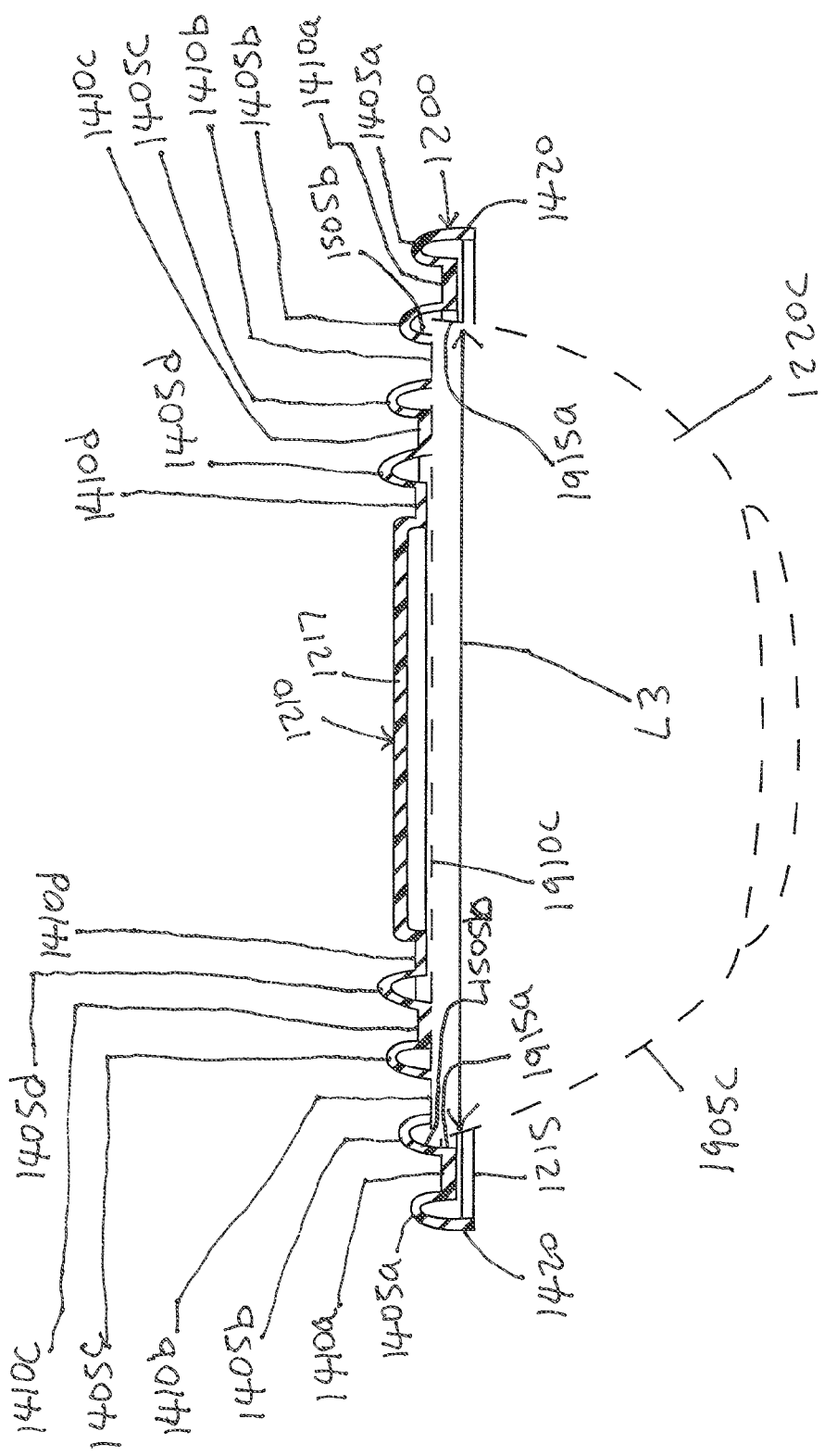
FIG. 21 is a block diagram of a cross-sectional side view of a versatile container lid, in accordance with an embodiment of the invention, wherein a container of a third size is attached to the lid.

FIG. 21 is a block diagram of a cross-sectional side view of a versatile container lid 1200, in accordance with an embodiment of the invention, wherein a container 1220*c* of a third size L3 (e.g., maximum diameter L3) is attached to the bottom surface 1215 of the lid 1200. The wall 1905*c* of the container 1220*c* is in contact with the bottom surface 1505*b* of the peak 1405*b* and side surface 1915*a* of the valley 1410*a*, and therefore, the rim 1910*c* and wall 1905*c* of the container 1220*c* is removably in contact with and secured against the bottom surface 1505*b* of the peak 1405*b* and side surface 1915*a* of the valley 1410*a*.

Figure 22:
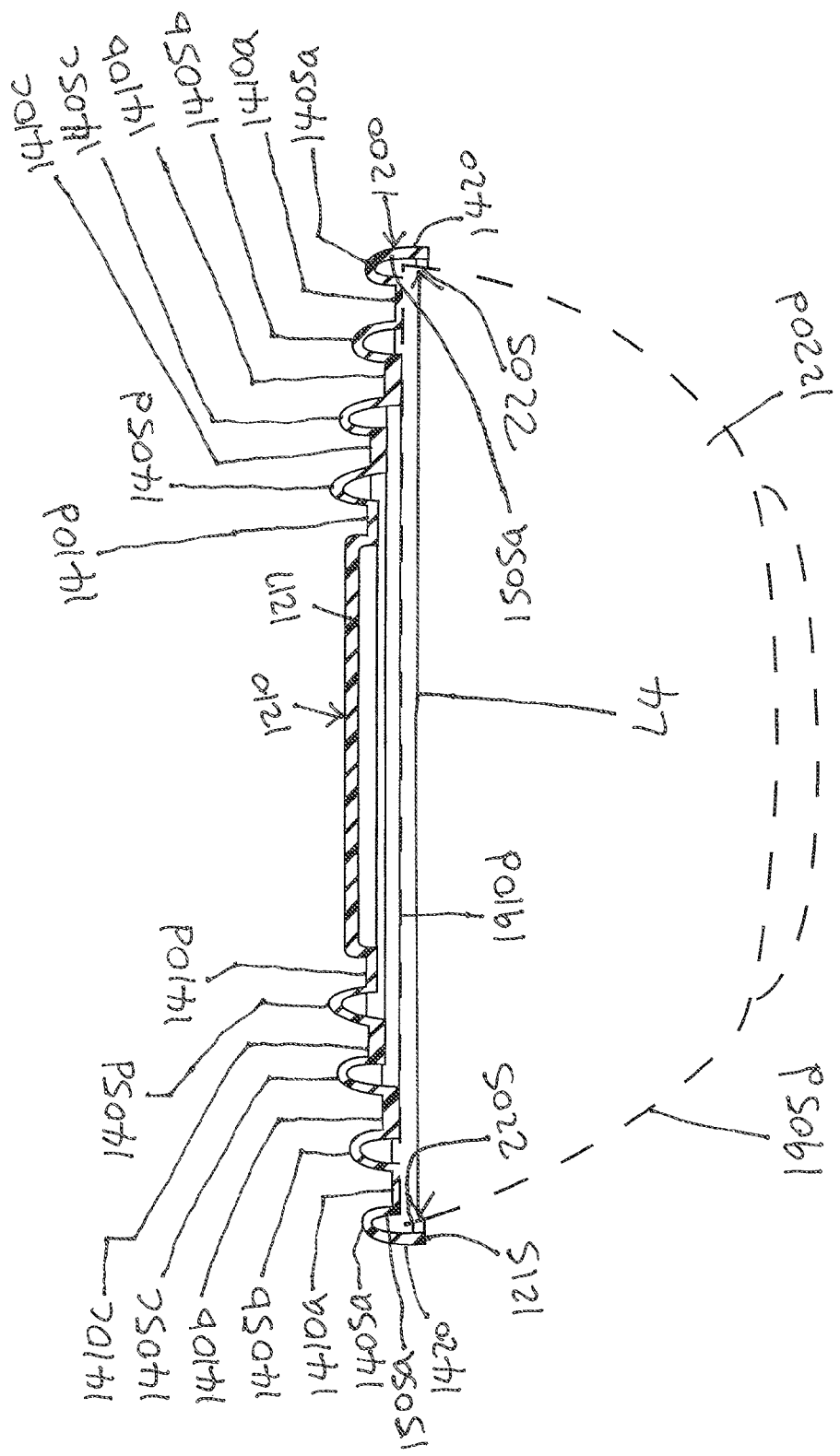
FIG. 22 is a block diagram of a cross-sectional side view of a versatile container lid, in accordance with an embodiment of the invention, wherein a container of a fourth size is attached to the lid.
Figure 73:
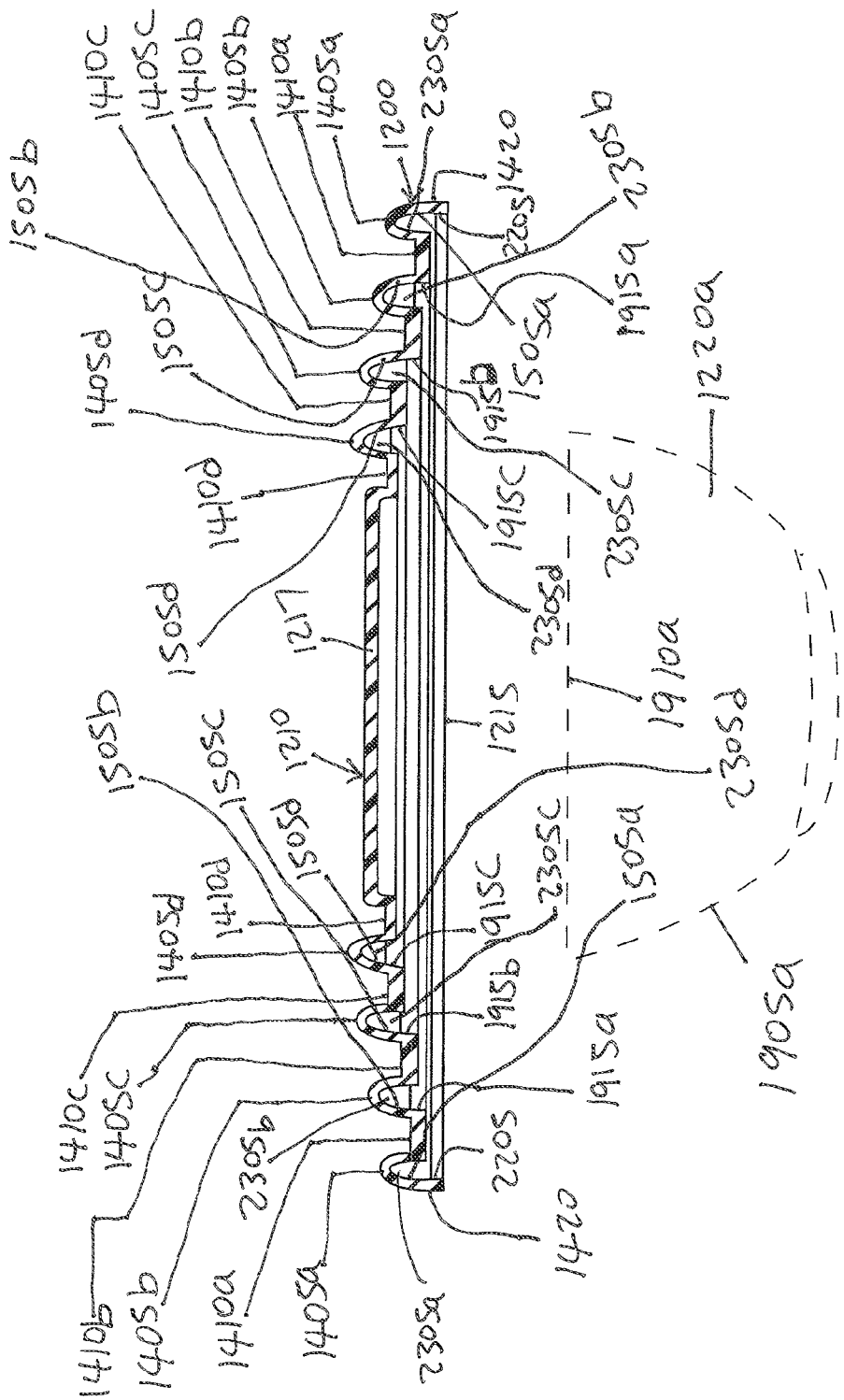

FIG. 22 is a block diagram of a cross-sectional side view of a versatile container lid 1200, in accordance with an embodiment of the invention, wherein a container 1220*d* of a fourth size L4 (e.g., maximum diameter L4) is attached to the bottom surface 1215 of the lid 1200. The wall 1905*d* of the container 1220*d* is in contact with the bottom surface 1505*a* of the peak 1405*a* and inner side surface 2205 of the lid edge (lid rim) 1420, and therefore, the rim 1910*d* and wall 1905*d* of the container 1220*d* is removably in contact with and secured against the bottom surface 1505*a* of the peak 1405*a* and inner side surface 2205 of the lid rim 1420.

FIG. 23 is a block diagram of a cross-sectional side view of a versatile container lid 1200, in accordance with an embodiment of the invention, wherein a container 1220*a* is detached or separated from the lid 1200.

Other variations in the components of the lid 1200 are possible in other embodiments of the invention.

The peaks 1405*a*, 1405*b*, 1405*c*, and 1405*d* include respective openings (or respective hollow portions) 2305*a*, 2305*b*, 2305*c*, and 2305*d*, respectively. The bottom surfaces 1505*a*, 1505*b*, 1505*c*, and 1505*d* define the boundaries of the openings 2305*a*, 2305*b*, 2305*c*, and 2305*d*, respectively. The containers 1220*a*, 1220*b*, 1220*c*, and 1220*d* include the top rims 1910*a*, 1910*b*, 1910*c*, and 1910*d*, respectively. The top rims 1910*a*, 1910*b*, 1910*c*, and 1910*d* are removably inserted into and removably secured within the openings 2305*d*, 2305*c*, 2305*b*, and 2305*a*, respectively.

In an embodiment of the invention, the lid 1200 (or lid 100 or other embodiments of the lid disclosed herein) may be formed by any suitable rigid material or semi-rigid material such as, by way of example and not by way of limitation, plastic, rubber, and/or another suitable synthetic material. In another embodiment of the invention as will be discussed below in additional details, the lid 1200 (or lid 100 or other embodiments of the lid disclosed herein) may be foldable and, therefore, the lid is at least partly formed by a suitably flexible material, substantially flexible material, or foldable material such as, by way of example and not by way of limitation, silicone (i.e., silicone rubber).

The lid 1200 (or lid 100), or other embodiments of the lid disclosed herein may be manufactured by standard manufacturing methods known to those skilled in the relevant art(s) such as, by way of example and not by way of limitation, molding, stamping, extrusion processing, casting, polymer foam processing and forming, and/or other standard shaping processes of synthetic materials.

In an embodiment of the invention, a bendable portion of the lid 1200 (or lid 100 or other embodiments of the lid disclosed herein) is formed from a substantially bendable material that maintains the shape that is configured for the bendable material. For example, the bendable portion may be formed from silicone (or silicone rubber or polydimethylsiloxane) or another suitable silicon polymer with rubber-like properties. As known to those skilled in the relevant art(s), silicone rubber is a polymer of silicon-containing carbon, hydrogen and oxygen. Silicone rubber has excellent insulating and temperature-resistant properties. Silicone rubber is made through a process known as vulcanization or curing of natural rubber. Silicon is injected into the long hydrocarbon chains of natural rubber through a dual-stage process under high heat and pressure, thus converting it into silicone rubber. Additionally, the cured rubber is processed with additional steps until the final marketable product is obtained. Silicone rubber maintains all of its properties even at high temperatures of approximately 300 degrees Celsius as well as at low temperatures around −55 degrees Celsius. The silicon-carbon bonds in silicone rubber are resistant to temperature fluctuations. Additionally, silicone rubber exhibits better tear strength, tensile strength, elongation and compression in comparison to natural rubber at high temperatures. To provide added rigidity to the bendable portion and decreased elasticity to the bendable portion, a suitable amount of sulfur is added to the liquid rubber during the manufacturing process. If rigidity is added to (and elasticity is decreased for) the silicone used to form the bendable portion, then the bendable portion can be bent in the downward direction and the bendable portion will not automatically return back to its prior shape in the upward direction, and/or the portion 815 can be bent in the upward direction and the bendable portion will not automatically return back to a prior shape in the downward direction. Other standard steps known to those skilled in the relevant art(s) for setting the characteristics of silicone may be used in the bendable portion. In an embodiment of the invention, other portions of the lid 1200 may be formed from the same material that forms the bendable portion.

Those skilled in the art will realize, after reading the discussion herein, that other suitable materials or combination of suitable materials can be used for the components in the lid 1200. Those skilled in the art will also realize, after reading the discussion herein, that the assembly, manufacture, and/or construction of the components of the lid 1200 may be selectively varied based on cost, ease of manufacturing, or/and other considerations. Additionally, the parts or components in the lid 1200 can be suitably varied or substituted with other parts or components or shapes, as manufacturing and parts technologies improve in the future.

In one embodiment of the invention, a versatile lid includes: a lid body comprising a stair-steps configuration; and a plurality of rings formed in the lid body; wherein the plurality of rings includes a first ring that is configured to receive a first container having a first size and a second ring that is configured to receive a second container having a second size. In another embodiment of the invention, a versatile lid includes: a lid body comprising a center portion, a bendable lid portion, and an edge portion; wherein the bendable lid portion is between the center portion and the edge portion; and wherein the bendable lid portion is configured to bend in an upward direction and bend in a downward direction.

In another embodiment of the invention, a versatile lid comprises: a base portion; an upper portion coupled to the base portion; a non-planar element on a top surface of the upper portion; a lid body comprising a center portion, a bendable lid portion, and an edge portion; wherein the lid body includes and is between the base portion and the upper portion; wherein the plurality of rings comprises a plurality of hollow portion formed in the lid body and wherein each hollow portion is formed from the base portion to the upper portion and wherein each hollow portion forms a respective opening between two vertical walls; wherein the bendable lid portion is between the center portion and the edge portion; and wherein the bendable lid portion is configured to bend in an upward direction and bend in a downward direction.

In another embodiment of the invention, a method of manufacturing a versatile lid, the method comprises: forming a base portion, an upper portion coupled to the base portion, a non-planar element on a top surface of the upper portion, and a lid body including and between the base portion and the upper portion from a material; forming a plurality of rings within the lid body, wherein the plurality of rings comprises a plurality of hollow portions formed in the lid body and wherein each hollow portion is formed from the base portion to the upper portion and wherein each hollow portion forms a respective opening between two vertical walls; and forming the top surface of the upper portion of the lid body, wherein the top surface has a given configuration.

In a method according to the invention, the plurality of rings may include a first ring that is configured to receive a first container having a first size and a second ring that is configured to receive a second container having a second size.

In a method according to the invention, the lid body comprises a bendable lid portion and wherein the bendable lid portion is configured to bend in an upward direction and bend in a downward direction.

Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A versatile lid comprising:
a silicone lid body comprising a bendable silicone stair-steps configuration, a bendable silicone top center portion, and a bendable silicone rim that spans an outer edge of the versatile lid;
wherein the lid body including the stair-steps configuration, top center portion, and rim comprise a same material of silicone;
wherein the rim comprises a silicone bendable edge portion that spans the outer edge of the versatile lid and is external to the stair-steps configuration; and
a plurality of bendable silicone rings formed in the lid body, wherein the rings are external to the top center portion of the lid body;
wherein the plurality of bendable silicone rings includes a first ring that is configured to receive a first container having a first size and a second ring that is configured to receive a second container having a second size;
wherein the plurality of bendable silicone rings comprises a plurality of hollow portions formed in the lid body and wherein each hollow portion is formed from a base portion of the lid body to an upper portion of the lid body, wherein the base portion includes the silicone bendable edge portion that spans the outer edge of the versatile lid and that is external to the stair-steps configuration, and wherein each hollow portion forms a respective opening between two vertical silicone walls;
wherein a bendable lid portion includes the top center portion of the lid body and the silicone bendable edge portion of the lid body;
wherein the bendable lid portion is configured to bend in an upward direction and bend in a downward direction;
wherein the first ring is between the top center portion and the second ring;
wherein the second ring is between the first ring and the bendable edge portion and wherein the second ring includes the bendable edge portion;
wherein the silicone bendable edge portion is around the plurality of bendable silicone rings;
wherein the first ring comprises a first hollow portion between the top center portion and the second ring; and
wherein the second ring comprises a second hollow portion between the first ring and the rim;
wherein the second hollow portion is adjacent to and directly between an inner wall on the rim, another wall that is opposite the inner wall, and a bottom surface of the base portion.

2. The versatile lid of claim 1, wherein the first ring has a first dimension and the second ring has a second dimension and wherein the first dimension is smaller than the second dimension.

3. The versatile lid of claim 1, wherein the plurality of bendable silicone rings comprises openings in the lid body.

4. The versatile lid of claim 1, wherein the plurality of bendable silicone rings are substantially circular.

5. The versatile lid of claim 1, wherein the plurality of bendable silicone rings are substantially square.

6. The versatile lid of claim 1, wherein the plurality of bendable silicone rings are substantially rectangular.

7. The versatile lid of claim 1, wherein the lid body comprises a single silicone material.

8. The versatile lid of claim 1, wherein the lid body provides a substantially sealed cover on any of the first container and the second container.

9. A versatile lid comprising:
a silicone base portion;
a silicone upper portion coupled to the base portion;
a silicone non-planar element on a top surface of the upper portion;
a silicone lid body comprising a bendable silicone center portion, a bendable lid portion, and a bendable silicone rim that spans an outer edge of the versatile lid;
wherein the base portion, the upper portion, and lid body including the rim comprise a same material of silicone;

wherein the rim comprises a silicone bendable edge portion that spans the outer edge of the versatile lid and is external to the base portion and center portion;

wherein the lid body includes and is between the base portion and the upper portion;

wherein a plurality of bendable silicone rings comprises a plurality of hollow portions formed in the lid body, wherein the base portion includes the silicone bendable edge portion that spans the outer edge of the versatile lid and that is external to the base portion, and wherein each hollow portion is formed from the base portion to the upper portion and wherein each hollow portion forms a respective opening between two silicone vertical walls;

wherein the bendable lid portion includes the center portion and the edge portion; and wherein the bendable lid portion is configured to bend in an upward direction and bend in a downward direction;

wherein the plurality of bendable silicone rings includes a first ring that is configured to receive a first container having a first size and a second ring that is configured to receive a second container having a second size;

wherein the first ring is between the center portion and the second ring;

wherein the second ring is between the first ring and the bendable edge portion and wherein the second ring includes the bendable edge portion;

wherein the silicone bendable edge portion is around the plurality of bendable silicone rings;

wherein the first ring comprises a first hollow portion between the center portion and the second ring; and wherein the second ring comprises a second hollow portion between the first ring and the rim;

wherein the second hollow portion is adjacent to and directly between an inner wall on the rim, another wall that is opposite the inner wall, and a bottom surface of the base portion.

10. The versatile lid of claim 9, wherein the first ring has a first dimension and the second ring has a second dimension and wherein the first dimension is smaller than the second dimension.

11. The versatile lid of claim 9, wherein the plurality of bendable silicone rings comprises openings in the lid body.

12. The versatile lid of claim 9, wherein the plurality of bendable silicone rings are circular.

13. The versatile lid of claim 9, wherein the plurality of bendable silicone rings are square.

14. The versatile lid of claim 9, wherein the plurality of bendable silicone rings are rectangular.

15. A method of manufacturing a versatile lid, the method comprising:

forming a silicone base portion, a silicone upper portion coupled to the base portion, a silicone non-planar element on a top surface of the upper portion, and a silicone lid body including and between the base portion and the upper portion from a material of silicone;

wherein the silicone lid body comprises a bendable silicone center portion, a bendable lid portion, and a bendable silicone rim that spans an outer edge of the versatile lid;

wherein the base portion, the upper portion, and lid body including the rim comprise a same material of silicone;

wherein the rim comprises a silicone bendable edge portion that spans the outer edge of the versatile lid and is external to the base portion and center portion;

forming a plurality of bendable silicone rings within the lid body, wherein the plurality of bendable silicone rings comprises a plurality of hollow portions formed in the lid body, wherein the base portion includes the silicone bendable edge portion that spans the outer edge of the versatile lid and that is external to the base portion, and wherein each hollow portion is formed from the base portion to the upper portion and wherein each hollow portion forms a respective opening between two silicone vertical walls; and forming the top surface of the upper portion of the lid body, wherein the top surface has a given configuration;

wherein the plurality of bendable silicone rings includes a first ring that is configured to receive a first container having a first size and a second ring that is configured to receive a second container having a second size;

wherein the lid body comprises the bendable lid portion and wherein the bendable lid portion is configured to bend in an upward direction and bend in a downward direction;

wherein the first ring is between the center portion and the second ring;

wherein the second ring is between the first ring and the bendable edge portion and wherein the second ring includes the bendable edge portion;

wherein the silicone bendable edge portion is around the plurality of bendable silicone rings;

wherein the first ring comprises a first hollow portion between the center portion and the second ring; and wherein the second ring comprises a second hollow portion between the first ring and the rim;

wherein the second hollow portion is adjacent to and directly between an inner wall on the rim, another wall that is opposite the inner wall, and a bottom surface of the base portion.

* * * * *